United States Patent
Yerubandi et al.

(10) Patent No.: US 11,920,464 B2
(45) Date of Patent: Mar. 5, 2024

(54) THERMAL ANALYSIS OF TEMPERATURE DATA COLLECTED FROM A DISTRIBUTED TEMPERATURE SENSOR SYSTEM FOR ESTIMATING THERMAL PROPERTIES OF A WELLBORE

(71) Applicant: HALLIBURTON ENERGY SERVICES, INC., Houston, TX (US)

(72) Inventors: Krishna Babu Yerubandi, Houston, TX (US); John Paul Bir Singh, Kingwood, TX (US); John L. Maida, Houston, TX (US); Mikko Jaaskelainen, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 266 days.

(21) Appl. No.: 17/039,054

(22) Filed: Sep. 30, 2020

(65) Prior Publication Data
US 2021/0238985 A1     Aug. 5, 2021

Related U.S. Application Data

(60) Provisional application No. 62/969,026, filed on Feb. 1, 2020, provisional application No. 62/968,991, filed on Jan. 31, 2020.

(51) Int. Cl.
   *E21B 47/07*    (2012.01)
   *G01K 1/02*    (2021.01)
   (Continued)

(52) U.S. Cl.
   CPC .............. *E21B 47/07* (2020.05); *G01K 1/026* (2013.01); *G01K 11/3206* (2013.01);
   (Continued)

(58) Field of Classification Search
   CPC .... E21B 47/07; G01K 1/026; G01K 11/3206; G01K 11/322; G01K 11/324; G01K 2213/00
   (Continued)

(56) References Cited

U.S. PATENT DOCUMENTS

| | | |
|---|---|---|
| 2,838,116 A | 6/1958 | Clark, Jr. et al. |
| 3,250,330 A | 5/1966 | Smith, Jr. |
| | (Continued) | |

FOREIGN PATENT DOCUMENTS

| | | | |
|---|---|---|---|
| CN | 102628356 B | * | 9/2015 |
| GB | 2328968 A | | 3/1999 |
| | (Continued) | | |

OTHER PUBLICATIONS

English translation of CN 102628356, Sep. 2015. (Year: 2015).*
(Continued)

*Primary Examiner* — Michael P Nghiem
(74) *Attorney, Agent, or Firm* — NOVAK DRUCE CARROLL LLP

(57) ABSTRACT

Temperature data collected from a distributed temperature sensing system may be used to prepare a temporal thermal profile of the wellbore. The temporal thermal profile may be used to determine a generalized heat transfer coefficient (k) and/or a generalized geothermal profile ($T_{ae}$). The temporal thermal profile and the generalized heat transfer coefficient (k) and/or the generalized geothermal profile ($T_{ae}$) may be used to estimate thermal properties of a wellbore, such as well as fluid and flow characteristics. A heat of hydration index may also be determined based on the temporal thermal profile.

22 Claims, 15 Drawing Sheets

US 11,920,464 B2

Page 2

(51) Int. Cl.
*G01K 11/3206* (2021.01)
*G01K 11/322* (2021.01)
*G01K 11/324* (2021.01)

(52) U.S. Cl.
CPC .......... *G01K 11/322* (2021.01); *G01K 11/324* (2021.01); *G01K 2213/00* (2013.01)

(58) Field of Classification Search
USPC .......................................................... 702/6
See application file for complete search history.

(56) References Cited

U.S. PATENT DOCUMENTS

| | | | |
|---|---|---|---|
| RE27,459 E | 8/1972 | Guinn et al. | |
| 4,832,121 A | 5/1989 | Anderson | |
| 5,275,038 A | 1/1994 | Sizer et al. | |
| 5,375,661 A | 12/1994 | Daneshy et al. | |
| 5,892,176 A | 4/1999 | Findlay et al. | |
| 5,996,689 A | 12/1999 | Head | |
| 6,268,911 B1 | 7/2001 | Tubel et al. | |
| 6,367,548 B1 | 4/2002 | Purvis et al. | |
| 6,531,694 B2 | 3/2003 | Tubel et al. | |
| 6,532,839 B1 | 3/2003 | Kluth et al. | |
| 6,634,425 B2 | 10/2003 | King et al. | |
| 7,055,604 B2 | 6/2006 | Jee et al. | |
| 7,448,448 B2 | 11/2008 | Lovell et al. | |
| 7,617,873 B2 | 11/2009 | Lovell et al. | |
| 8,436,743 B2 | 5/2013 | Auzerais et al. | |
| 9,708,867 B2 | 7/2017 | Lovell et al. | |
| 2002/0007945 A1 | 1/2002 | Neuroth et al. | |
| 2008/0236836 A1 | 10/2008 | Weng | |
| 2010/0106421 A1* | 4/2010 | Macpherson | G01K 7/42 702/6 |
| 2010/0108311 A1* | 5/2010 | Daussin | E21B 43/025 166/250.01 |
| 2012/0012308 A1* | 1/2012 | Ziauddin | E21B 47/07 166/250.1 |
| 2012/0205103 A1 | 8/2012 | Ravi et al. | |
| 2015/0330214 A1 | 11/2015 | Duphorne | |
| 2017/0002622 A1 | 1/2017 | De Bruijn et al. | |
| 2017/0139076 A1 | 5/2017 | Van Oort et al. | |
| 2017/0226850 A1 | 8/2017 | Shako et al. | |
| 2017/0260846 A1 | 9/2017 | Jin et al. | |
| 2018/0106777 A1 | 4/2018 | Duan et al. | |
| 2018/0201824 A1 | 7/2018 | Rodrigues et al. | |
| 2019/0264555 A1* | 8/2019 | Seabrook | G01V 99/005 |
| 2020/0056084 A1* | 2/2020 | Foster | C04B 20/107 |

FOREIGN PATENT DOCUMENTS

| | | |
|---|---|---|
| WO | 2002057805 A2 | 7/2002 |
| WO | 2004018840 A1 | 3/2004 |

OTHER PUBLICATIONS

Johnson, D.O., et al., Society of Petroleum Engineers (SPE) Paper # 77460, "Identification of Steam Breakthrough Intervals Using DTS Technology," Sep. 2002.
Fryer, V., et al., Society of Petroleum Engineers (SPE) Paper # 92962, "Monitoring of Real-Time Temperature Profiles Across Multizone Reservoirs During Production and Shut-In Periods Using Permanent Fiber-Optic Distributed Temperature Systems," Apr. 2005.
Economides, M.J., "a practical companion to reservoir stimulation," Developments in Petroleum Science, vol. 34, 1992.
Economides, M.J. et al., "Reservoir Stimulation," Second Edition, 1989.
Smith, Robert, et al., Society of Petroleum Engineers (SPE) Paper # 2686, "Computer Study of Factors Affecting Temperature Profiles in Water Injection Wells," Journal of Petroleum Engineering, p. 1447, Nov. 1970.
Rajah, Benny, et al., Society of Petroleum Engineers (SPE) Paper # 29290, "Experiences and Results of Acid Prepacking and Gravelpacking Wells in the West Luton Field in Sarawak, Malaysia," Mar. 1995.
Wehunt, Jr., C.D., Society of Petroleum Engineers (SPE) Paper # 20137, "Evaluation of Alternating Phase Fracture Acidizing Treatment Using Measured Bottomhole Pressure," Mar. 1990.
Nelson, R.L., et al., Society of Petroleum Engineers (SPE) Paper # 39943, "Multiple Pad-Acid Fracs in a Deep Horizontal Well," Apr. 1998.
Krawietz, T.E., et al., Society of Petroleum Engineers (SPE) Paper # 27809, "Horizontal Well Acidizing of a Carbonate Formation: A Case History of Lisburne Treatments, Prudhoe Bay, Alaska," Nov. 1996.
International Search Report and Written Opinion for for International application No. PCT/US2020/054034, dated Jan. 20, 2021, 14 pages.
Examination Report; Great Britain Application No. 2209331.4; dated Jun. 20, 2023.

* cited by examiner

THERMAL ANALYSIS OF TEMPERATURE DATA COLLECTED FROM A DISTRIBUTED TEMPERATURE SENSOR SYSTEM FOR ESTIMATING THERMAL PROPERTIES OF A WELLBORE

CROSS-REFERENCE TO RELATED APPLICATIONS

This application claims the benefit of U.S. Provisional Application No. 62/969,026, filed on Feb. 1, 2020 and claims the benefit of U.S. Provisional Application No. 62/968,991, filed on Jan. 31, 2020, the disclosure of each of the aforementioned applications is hereby incorporated by reference in their entirety.

FIELD

The present disclosure relates generally to a system and method for analyzing temperature data collected from a distributed temperature sensing system ("DTS") to estimate thermal properties of the wellbore, as well as fluid and flow characteristics.

BACKGROUND

Wellbores are formed by drilling deep into subterranean formations in order to withdrawn hydrocarbons. Typically, after drilling, the wellbore is then lined with a steel casing so as to maintain the shape of the wellbore and to prevent the loss of fluids to the surrounding environment. The steel casing facilitates pumping fluid into and out of the wellbore and also facilitates zonal isolation. The steel casing is often bonded to the surface of the wellbore by cement or other sealant. Cementing operations are carried out to inject cement in to the wellbore and into the annulus between the casing and the wellbore.

Fiber optic sensing systems have been employed in wellbores for the detection of various properties, including temperature, strain, vibration, acoustics and pressure. In such fiber optic systems, light is often transmitted from the surface through the fiber optic cables and backscattered and/or reflected light is eventually received by a detector. Upon experiencing changes in the light during its transmission, the corresponding changes can be used to determine downhole properties.

BRIEF DESCRIPTION OF THE DRAWINGS

Implementations of the present technology will now be described, by way of example only, with reference to the attached figures, wherein.

DETAILED DESCRIPTION

Figure 1A:
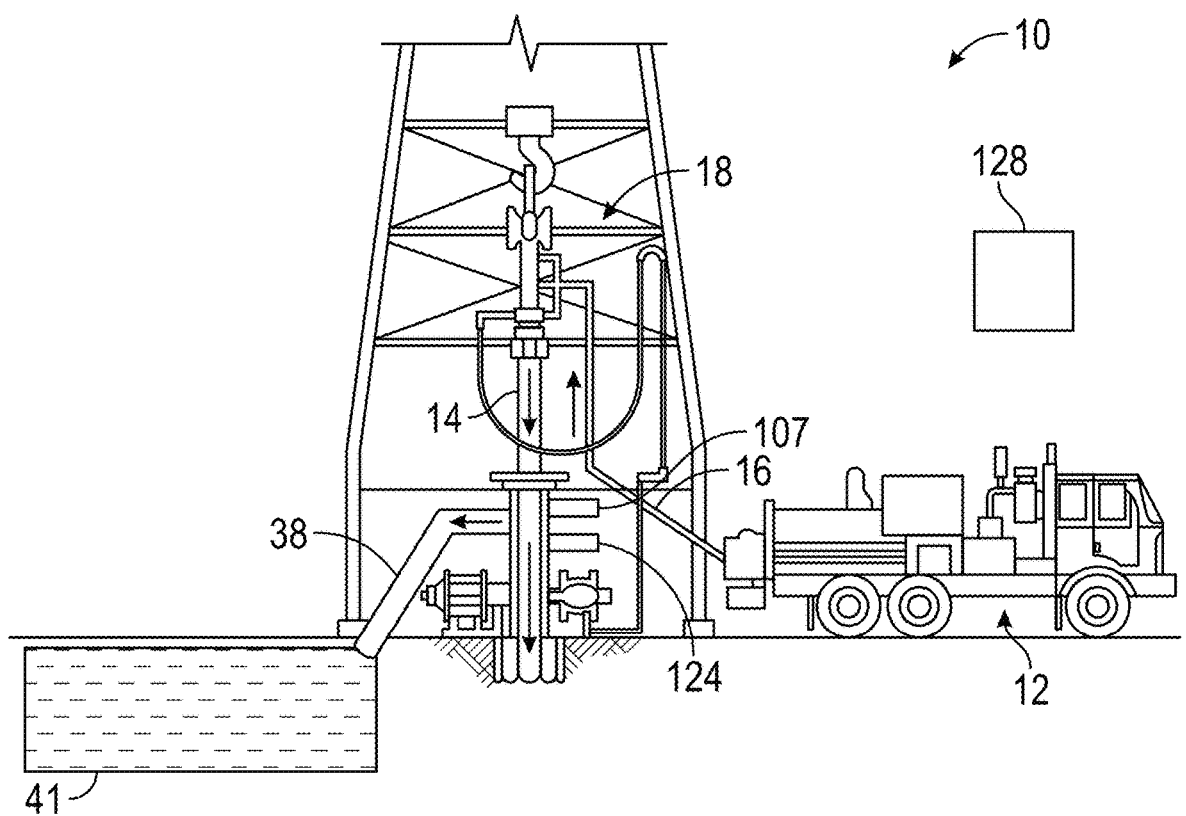
FIG. 1A illustrates a system for preparation and delivery of cement into a well bore in accordance with aspects of the present disclosure.

Various embodiments of the disclosure are discussed in detail below. While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

INTRODUCTION

The present disclosure is directed to the use of a data from a distributed temperature sensing system (DTS) to estimate thermal properties of a wellbore. The distributed temperature system may be a distributed fiber optic sensing system. In particular, the DTS system is employed to obtain data related to thermal properties over time along a plurality of depths of the wellbore, and then use determine a temporal thermal profile of the wellbore. The temporal profile can then be used to determine various properties and parameters of the wellbore and/or fluids within the wellbore.

The present disclosure may be implemented with respect to any downhole fluid, but may have particular implementation during cementing processes. During cementing operations, cement is pumped through the annulus of a casing to between the casing and the surface of the wellbore in order to fix the casing in place. During such operations operators monitor the progress or status of the cementing operation as well as determine when complications or irregularities may be occurring. For instance, monitoring the thermal profile may provide details regarding the progress of the hardening of the cement, whether there are changes in geometry of the wellbore, whether there is any loss or leakage of cement, or other issues.

During cementing the thermal properties of the cement may be impacted by the environment as well as aspects related to the cement itself, including (1) a geothermal profile of the wellbore under static fluid conditions, (2) its exchange with the environment under motion of a fluid, referred to as advection, and (3) heat generated by the reaction of the cement or fluid itself.

In particular, the formation surrounding the wellbore has a particular temperature and which may increase as depth increases, which may be referred to as a geothermal profile, which may also be referred to as an ambient temperature. The cement injected from the from the surface may differ from the geothermal profile, and so the temperature of the cement may increase or decrease as a result of the thermal exchange between the cement and the surrounding formation. Additionally, the cement has fluid movement as it progresses through the wellbore. Accordingly, the thermal exchange with the surroundings as result advection may also be taken in to account. Furthermore, the cement may undergo a hydration reaction during hardening, which is an exothermic reaction. Accordingly, heat is generated by the reaction of the cement itself. These factors may be taken into account to generate a model for thermal decay of the cement as well as the generalized geothermal profile.

The DTS may obtain data regarding temperature change over time to generate a temporal profile of the wellbore across a plurality of wellbore depths. The temporal profile may be used to determine a thermal model which accounts for the thermal changes of a fluid within the wellbore, such as cement. The thermal model may include a determination of lumped parameters (1) a generalized heat transfer coefficient (k) and (2) a generalized geothermal profile ($T_{ae}$). Both the generalized heat transfer coefficient (k) and the generalized geothermal profile may be evaluated along the depth of the wellbore to indicate the progress of a cementing operation or aspects of another fluid in the wellbore.

Additionally, the temporal profile may be used to generate a heat of hydration, or bond index. In particular, a generalized transfer coefficient (k) and a starting geothermal profile ($T_a$) may be determined based on the temporal thermal profile of the wellbore. The starting geothermal profile ($T_a$) is determined in the window after introduction of a cement into the wellbore but prior to it releasing heat from its exothermic hydration reaction. Accordingly, a typical thermal response is determined based on the a generalized transfer coefficient (k) and a starting geothermal profile ($T_a$), which will not include the heat of hydration of a cement or other fluid. The heat of hydration may then be determined by comparing the measured temperature over time by DTS system with a baseline thermal response model determined based on the generalized transfer coefficient (k) of a fluid within the wellbore and the starting geothermal profile ($T_a$).

The method of a thermal response at least one of a generalized transfer coefficient (k) of a fluid within the wellbore and a starting geothermal profile ($T_a$) based on the temporal thermal profile of the wellbore, the geothermal profile determined after introduction of a fluid into the wellbore but prior to the fluid releasing exothermic reaction heat. The heat of hydration by comparing the measured temperature by distributed temperature sensor system with a baseline thermal response model determined based on the generalized transfer coefficient (k) of a fluid within the wellbore and the starting geothermal profile ($T_a$).

DTS and Cementing Process

The present disclosure may be employed with any fluid in the wellbore, including fracturing fluids, production fluids, or with sealing fluids including cementing fluids. A particular implementation of the present disclosure is in cementing operations. In one aspect, cements, due to the heat liberated during the hydration process, exhibit a distinctively different thermal response compared to many other wellbore fluids. As such, it is possible to identify the heat from the hydration activity to identify the presence of cement at different depths during "wait on cement" (i.e., suspension of drilling operations to allow cement slurries to solidify, harden and develop compressive strength).

The cementing process typically proceeds by pumping cement through casing previously inserted into a wellbore after drilling. The casing of a wellbore can include a DTS to collect temperature data associated with the wellbore. The DTS may be a distributed fiber optic sensing system. The DTS can be installed inside or outside the casing or liner of a wellbore. Data collected from the DTS can be utilized to identify properties of a wellbore, such as geometry changes, flow restrictions, fluid losses and fluid positions, based on the thermal response of the fluid to the surroundings.

FIG. 1A illustrates an exemplary downhole cementing environment 10 in which the present disclosure may be implemented. The cement unit 12, which may be a truck as shown, may include mixing equipment and pumping equipment. The cement unit 12 may pump a cement 14 through a feed pipe 16 and to a cement head 18 which conveys the cement 14, or other fluid, downhole, for example into the wellbore 22 of FIG. 1B. At least a portion of the displaced fluids from the annulus may exit the wellbore annulus 32 via a flow line 38 and be deposited, for example, in one or more retention pits 41 (e.g., a mud pit). A laser 107 can transmit light through a fiber optic cable (see FIG. 1B), and a receiver 124 may be provided, both the laser 107 and receiver 124 may be communicatively coupled to a control unit 128.

Figure 1B:
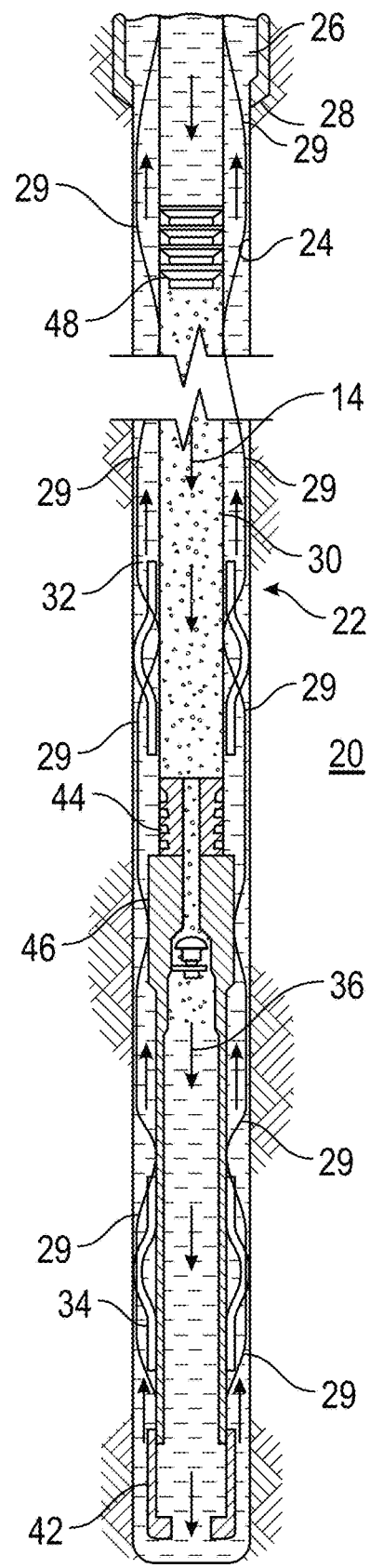
FIG. 1B is a diagram illustrating placement of cement into a well bore annulus having a fiber optic cable in accordance with aspects of the present disclosure.

As illustrated in FIG. 1B, a wellbore 22 which may be drilled into the subterranean formation 20. While wellbore 22 is shown extending generally vertically into the subterranean formation 20, the disclosure herein also includes wellbores that extend at an angle through the subterranean formation 20, such as horizontal and slanted wellbores. As illustrated, the wellbore 22 comprises surface 24. In the illustrated embodiments, a surface casing 26 has been inserted into the wellbore 22. The surface casing 26 may be cemented to the surface 24 of the wellbore 22 by cement sheath 28.

In the illustrated embodiment, casing 30 may also be disposed in the wellbore 22. A casing 30 may be encompass any conduit (e.g., intermediate casing, production casing, liners, etc.). As illustrated, there is a wellbore annulus 32 formed between the casing 30 and the surface 24 of the wellbore 22 and/or the surface casing 26. One or more centralizers 34 may be attached to the casing 30, for example, to centralize the casing 30 in the wellbore 22 prior to and during the cementing operation.

The fiber optic cable is arranged so as to be proximate the cement, such as passing through the cement, or immediately adjacent, or otherwise arranged to expose the fiber optic cable to downhole and/or cement temperature. One way to arrange the fiber optic cable is to attach it to the casing as it is being inserted into the wellbore. For instance, as shown in FIG. 1B, as the casing 30 is inserted into the wellbore, a fiber optic cable 29, having one or more optical fibers, may be attached to an external surface of the casing 30. The fiber optic cable 29 may extend longitudinally along the side of the casing 30 as shown in FIG. 1B. Although shown longitudinally, alternatively or additionally, the fiber optic cable 29 may be wrapped around the casing 30 in helical fashion. Any configuration of the fiber optic cable 29 may be provided in the cement 14 and annulus 32, such as straight, helical, or other arrangements in order to optimize exposure of the sensing cable to the temperature of the cement 14 and/or heat generated by hardening of the cement 14. A plurality of a fiber optic cables 29 may be employed to provide further areas of contact of the fiber optic cable with the cement.

Although FIG. 1B is illustrated as cement being pumped through the casing 30 first and then to the annulus 32, in other embodiments it may also be carried out in the reverse, where the cement is first pumped into the annulus and allowed to set, and/or pumped through the annulus 32 and up through the inside of the casing 30 to the surface.

Figure 1C:
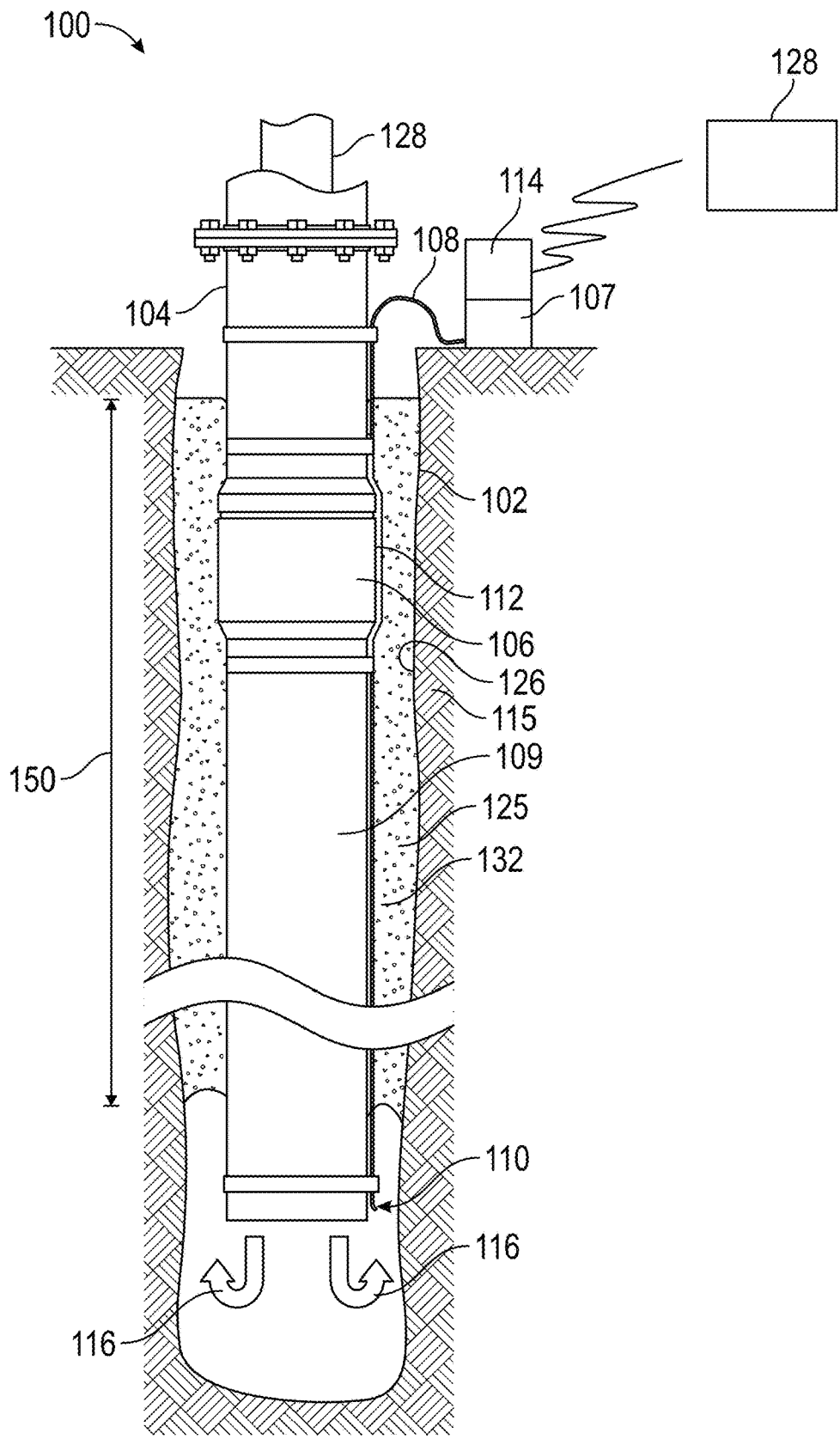
FIG. 1C diagram illustrating a cement slurry within the annulus of a wellbore and having a fiber optic cable disposed therein in accordance with aspects of the present disclosure

FIG. 1C illustrates an exemplary cementing environment 100 with the cement and fiber optic cable already arranged in the annulus of the wellbore as a distributed fiber optic sensing system. As shown a casing 104 is inserted into the wellbore 102 within a surrounding formation 115. As further shown a cement 125 is provided within the annulus 132 between the casing 104 and the surface 126 of the wellbore 102. The cement 125 extends along a plurality of depths 150. The cement 125 is in a slurry state as it is in a flowable state and not fully hardened. The arrows 116 illustrate that the cement 125 has flowed out of the bottom 110 of the casing 104 an into the annulus 132.

A fiber optic cable 108 may be inserted into the wellbore 102 along the length of the casing 104 which may be made up of a plurality of tubing joints and collars. In order to install the fiber optic cable 10, it may be attached to the casing 104 via attachment to collar 106 as the casing 104 is inserted into the wellbore. The fiber optic cable may be attached to the casing string using cross coupling clamps 112 and/or mid joint camps (not shown). Although one tubing joint 109 is shown, a casing 104 is made up of a plurality of such tubing joints 109 coupled by collars 106 forming a string and the fiber optic cable 108 may be attached to the collars 106 and/or tubing joints 109 during insertion of the casing 104. Tubing joints 109 may be tubular with a hollow bore for flow of fluids, and are often from 30 feet to 40 feet long. The fiber optic cable 108 may attach to a laser 107 and receiver 114 which are communicatively coupled to a control unit 128. The laser 107 may transmit light through the fiber optic cable 108 in pulses or other pattern, and the signal or data analyzed by the control unit 128.

Although the DTS is disclosed herein as employing fiber optic cables, a temperature measurement and profile may alternatively or additionally employ other temperature sensors such as a plurality of electronic temperature sensors such as thermocouples, platinum resistance sensors, transducers as well as wires for transmitting signals.

For wellbore models pertaining to drilling, cementing, completions and production, a wellbore temperature profile and thermal properties (e.g., conductivities, heat transfer coefficients, diffusivities, etc.) are unknowns. The subject technology estimates wellbore parameters under downhole conditions by analyzing temperature data collected from the DTS. The heat of hydration index can be used to confirm the presence of cements in the wellbore.

The DTS can utilize fiber optics disposed in the wellbore to calculate the depth and temporal thermal profile of the wellbore during and after a cement job. The thermal measurements can be analyzed to calculate a generalized heat transfer coefficient (k) and a generalized geothermal profile ($T_{ae}$) at different times and depths to characterize the wellbore, fluid, and flow behavior for the following:
 (a) changes in the wellbore geometry across depths;
 (b) static fluid profile (changes in fluid behavior);
 (c) pumping activity;
 (d) lost circulation; and/or
 (e) heat of hydration/heat release activity.

Figure 2A:
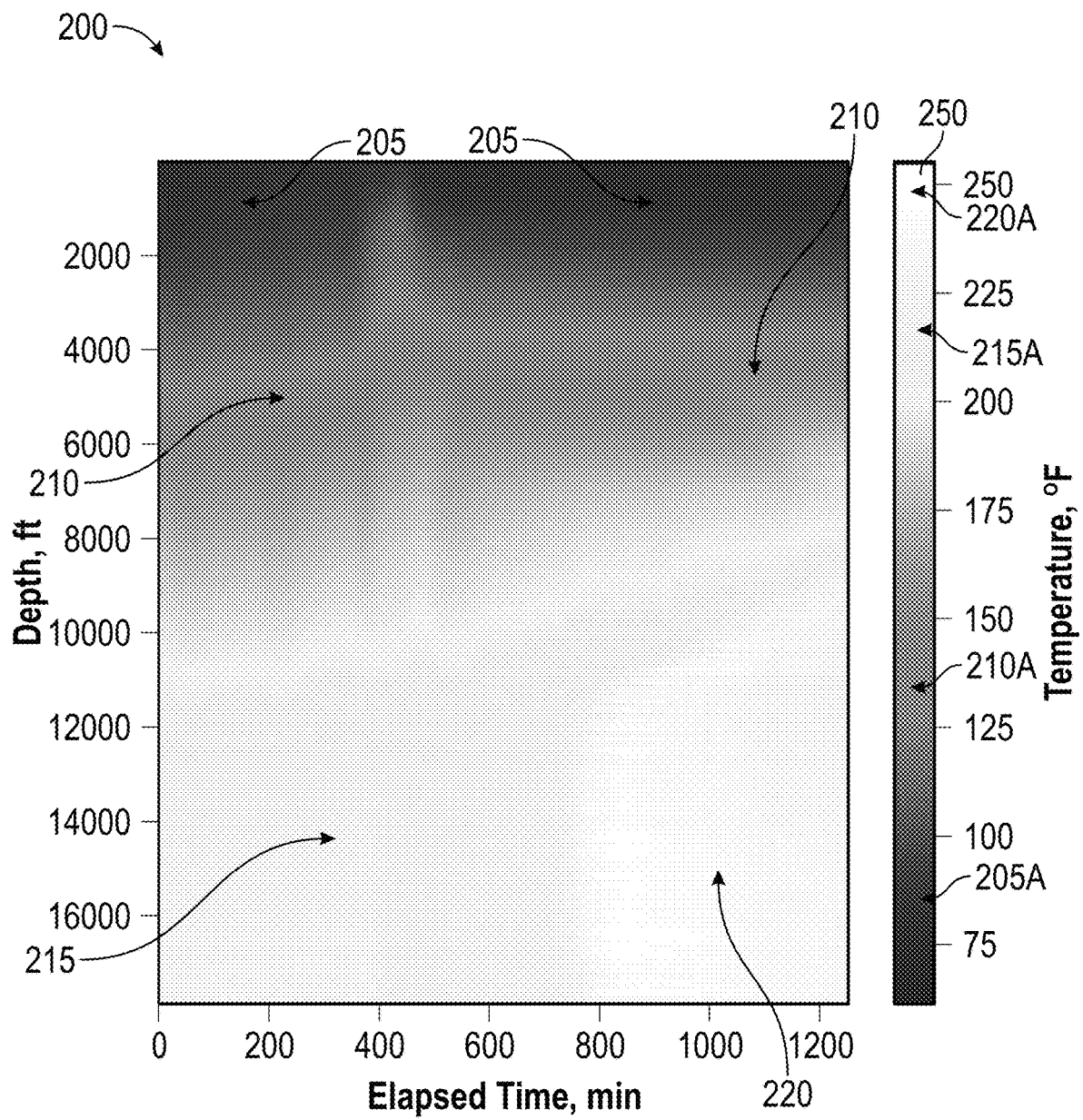
FIG. 2A illustrates an example of sample data collected from temperature sensors measured at different depths as a function of time in accordance with aspects of the present disclosure.

Distributed Temperature Profile:

FIG. 2A illustrates an example graph 200 of sample data collected from temperature sensors measured at different depths as a function of time. Accordingly, FIG. 2 shows an actual depth (e.g., true measurement depth or "TMD") and temporal thermal profile for a wellbore. As shown, the temperature increases as depth increases, the top portion of the graph showing black or dark red (or increasing lightness if viewed in black and white) its approximate placement shown by arrows 205 and its respective approximate placement on the legend 250 by arrow 205A. As depth increases toward 4,000 to 5,000 ft, the color turns to red (increasing lightness if viewed in black and white), its approximate placement shown by arrows 210 and their respective approximate placement on legend 250 by arrow 210A.

The color becomes yellowish below 12,000 ft, its approximate placement shown by arrow 215 (an increasing lightness as depth increases), and respective approximate placement on the legend 250 by arrow 215A. Further, as time progresses, as shown on the x axis, after about 800 minutes, the color turns whitish its approximate placement shown by arrow 220 (or increased lightness as compared to other portions of the graph 200), and respective approximate placement on the legend 250 by arrow 220A.

Accordingly, the relatively high temperature (denoted in light yellow to white colors, or increasing lightness in black and white) shown by arrow 220, is the typical signature of the heat reaction given off by the hydrating cement in the wellbore. As further shown in FIG. 1, the top of the cement is at approximately 8,000 ft, indicated by the lack of any heat of hydration above that depth. The non-monotonic behavior of the temperature profile at approximately 300-500 minutes throughout the wellbore is indicative of the various pumping operations. In the illustrated case, the cement is being placed in the wellbore during the aforementioned time period. Overall, the temperature increases from the surface toward the bottom hole, indicative of the geothermal gradient.

Figure 2B:
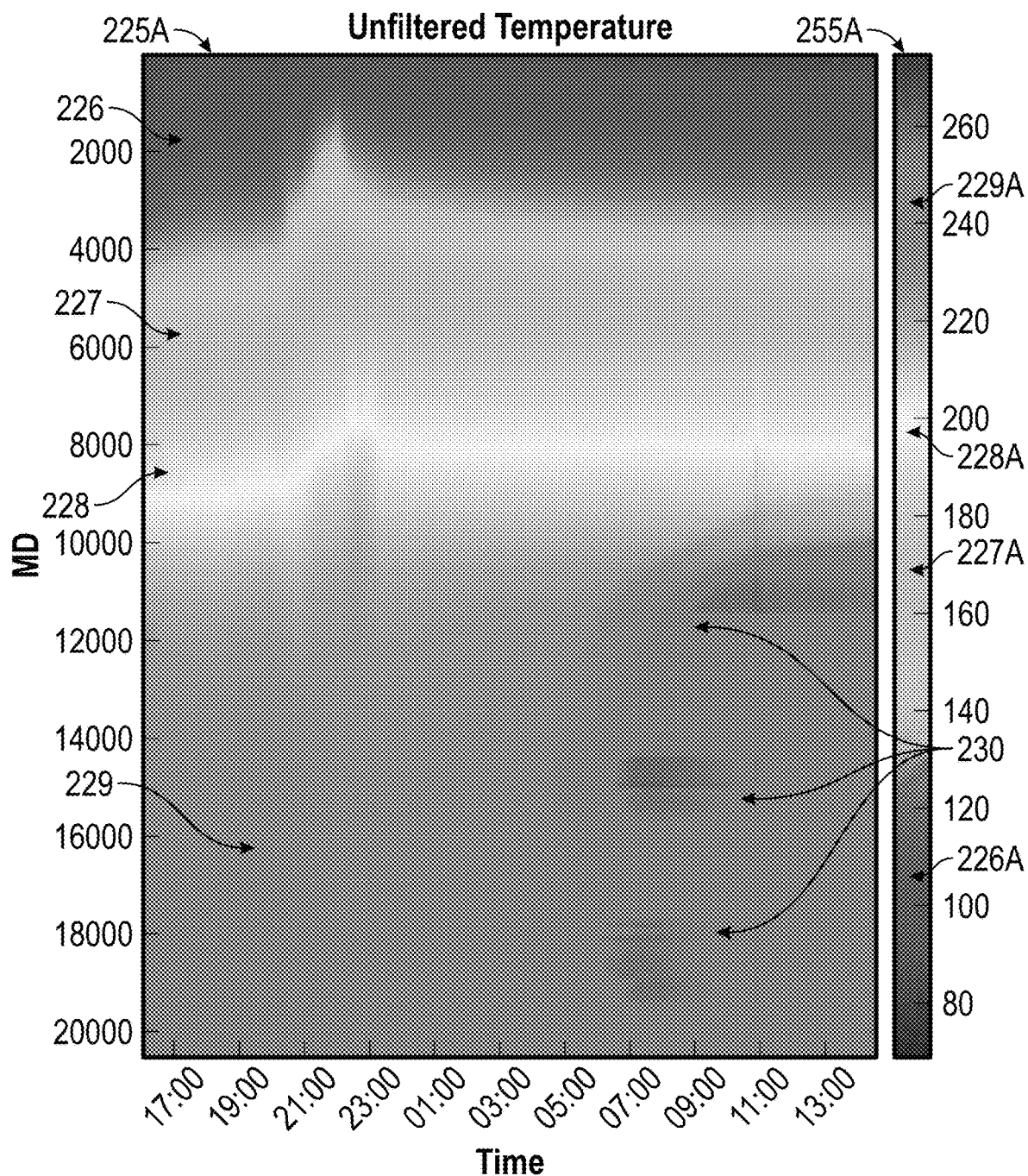
FIG. 2B illustrates a magnified portion of the sample data illustrated in FIG. 2A.
Figure 2B:
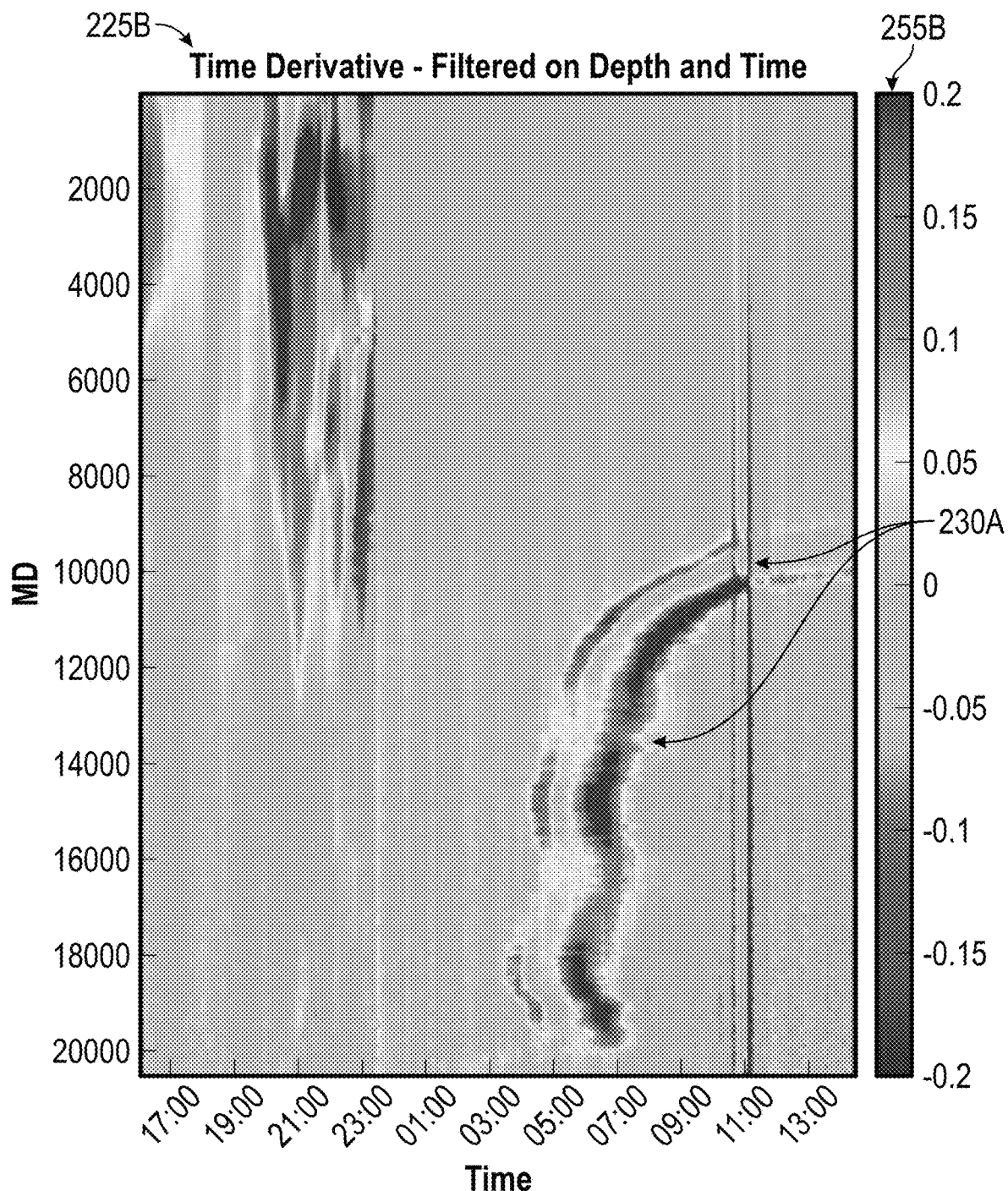

FIG. 2B illustrates an example graph 225A of sample data collected from temperature sensors measured at different depths as a function of time. The depth is shown from 2,000 to 20,000 ft. Accordingly, FIG. 2B shows measured depth and temporal thermal profile for a wellbore. As shown, the temperature increases as depth increases, the top portion of the graph showing light black or dark blue its approximate placement shown by arrows 226 and its respective approximate placement on the legend 255A by arrow 226A. As depth increases toward 4,000 to 5,000 ft, the color turns to greenish (increasing lightness if viewed in black and white), its approximate placement shown by arrow 227 and its respective approximate placement on legend 255A by arrow 227A. As depth further increases toward 8,000 to 9,000 ft, the color turns to yellowish (increasing in lightness if viewed in black and white), its approximate placement shown by arrow 228 and its respective approximate placement on the legend 255A by arrow 228A. As depth further increases beyond 12,000 ft, the color turns to reddish (increasing in darkness if viewed in black and white), its approximate placement shown by arrow 229 and its respective approximate placement on the legend 255A by arrow 229A.

Further, below 10,000 ft, as time progresses, as shown on the x axis, starting at about 5:00 to 7:00, the texture changes, having darkened areas, having an approximate arcuate shaped extending horizontally from 10,000 ft. to 20,000, illustrated by the arrows 230 and respective approximate placement on the legend 250 by arrow 220A. This area shown by the arrows 230 is the typical signature of the heat reaction given off by the hydrating cement in the wellbore. As shown in the graph 225B, which illustrates the same data as in graph 225A, but with a time derivative, and filtered on depth and time, more clearly shows the change in temperature illustrated by arrows 230A which may be attributed to the heat of hydration starting at about 5:00 to 7:00.

Figure 2C:
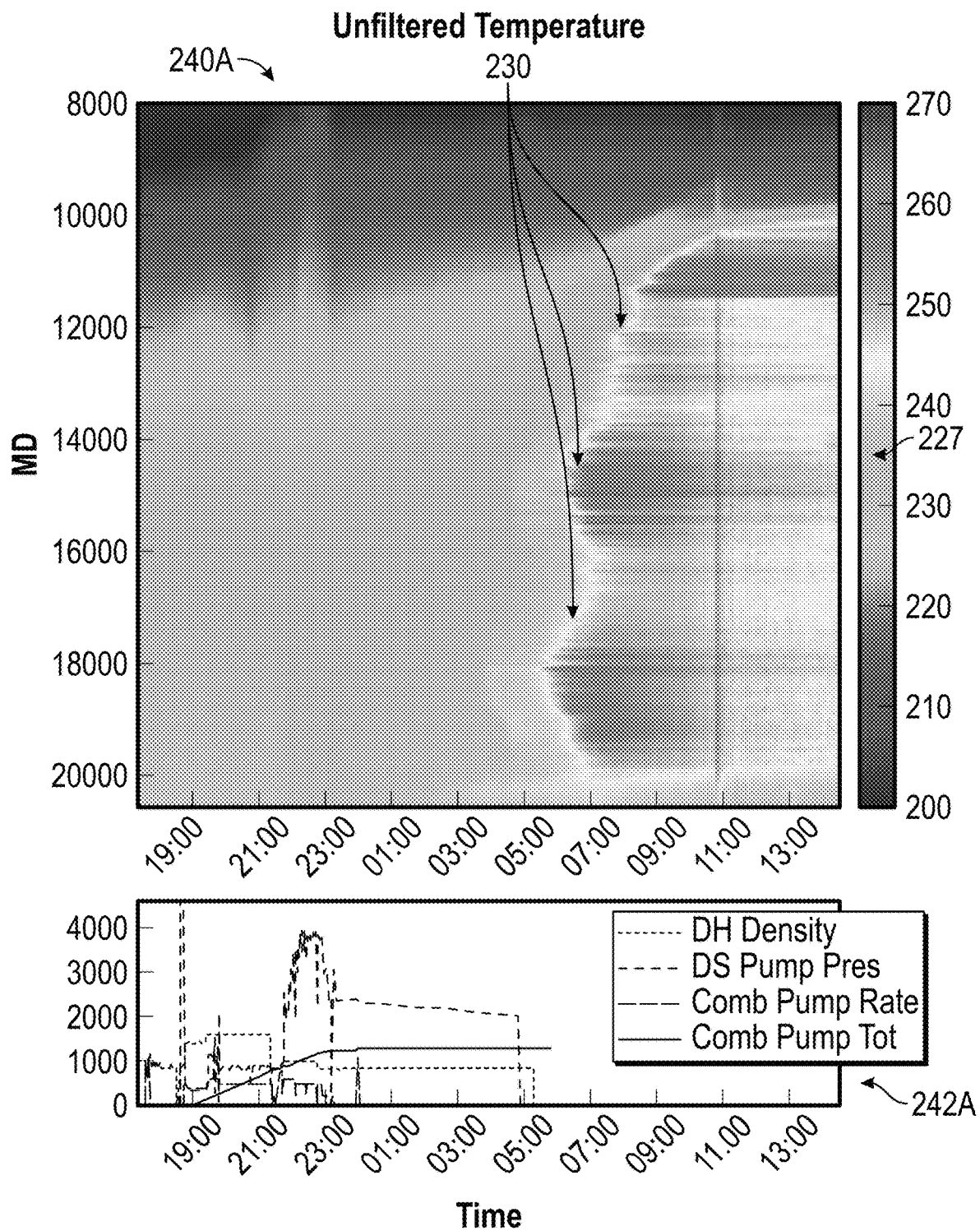
FIG. 2C illustrates a magnified portion of the sample data illustrated in FIG. 2A.
Figure 2C:
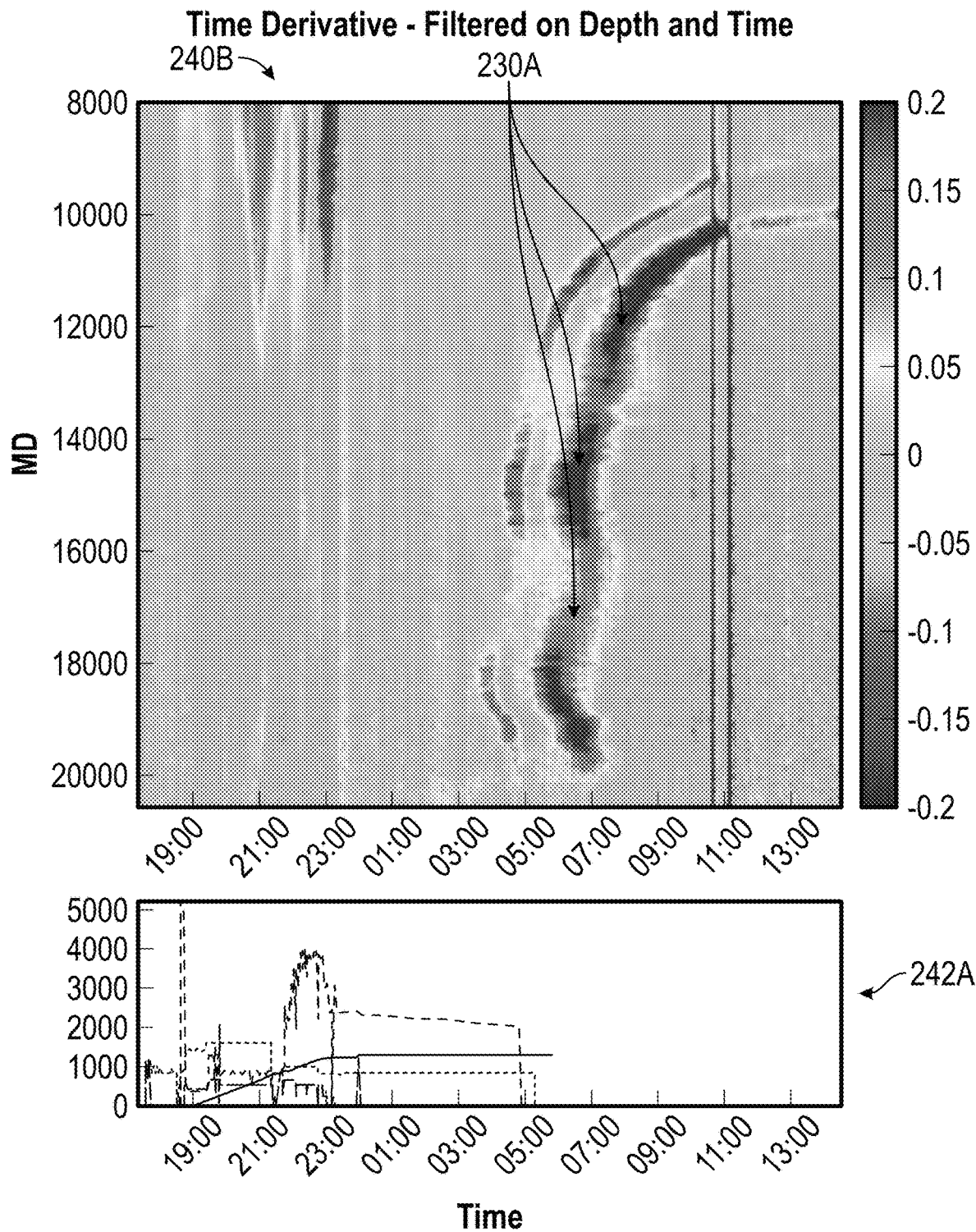

FIG. 2C illustrates a magnified portion of FIG. 2B, in particular the lower right portion of FIG. 2B, in order to better illustrate the portion showing the heat of hydration. Accordingly, graph 240A of FIG. 2C begins the y-axis at 8,000 ft and extends to 20,000 ft. The arrows 230 again show the thermal change as time progresses, starting at about 5:00 to 7:00. Further, graph 242A below graph 240A shows density, pump pressure, pump rate and pump totals to provide more detail regarding the cement system. Graph 240B shows the time derivative, and filtered on depth and time, more clearly showing the change in temperature illustrated by arrows 230A which may be attributed to the heat of hydration starting at about 5:00 to 7:00.

Figure 2D:
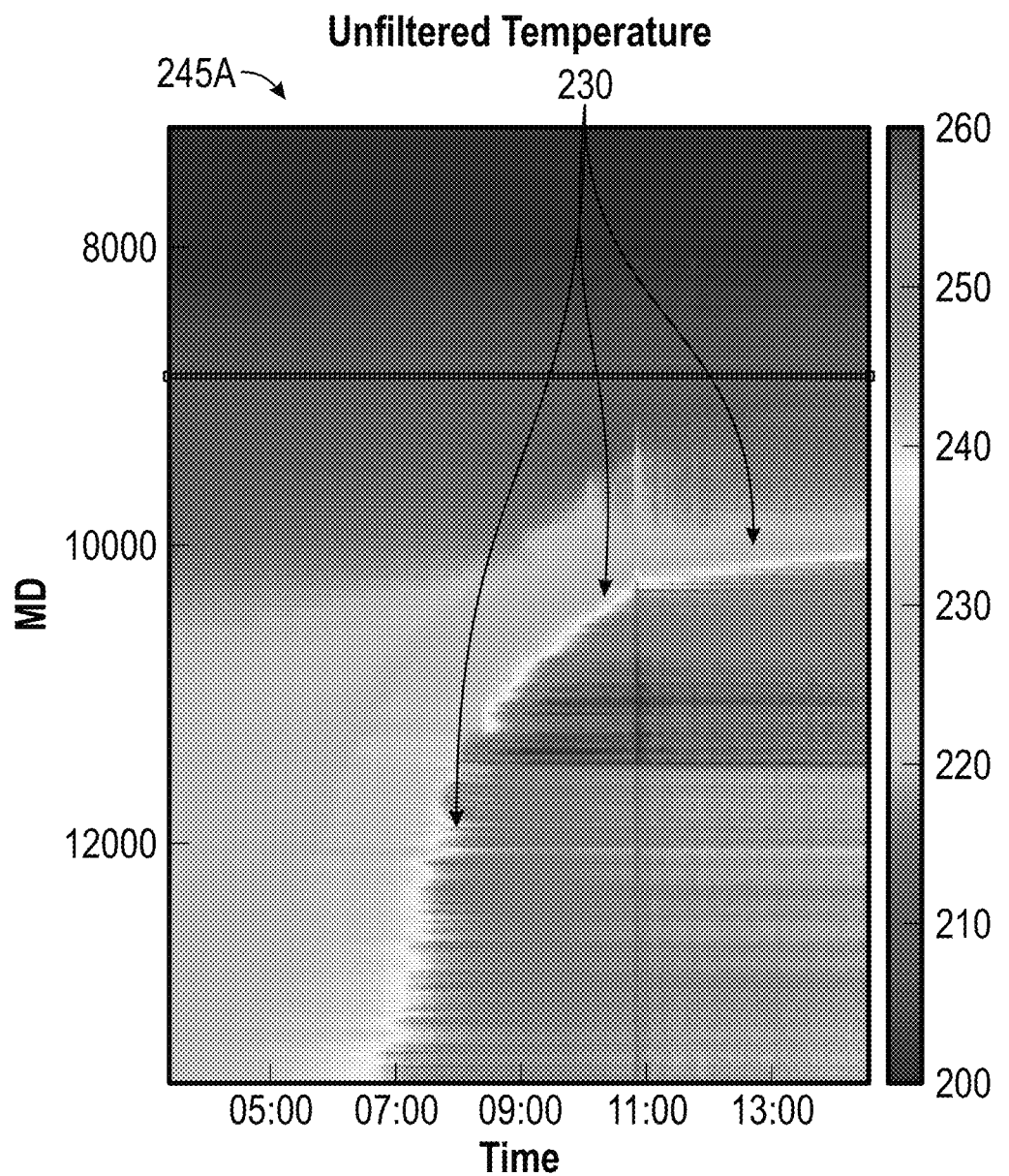
FIG. 2D illustrates a magnified portion of the sample data illustrated in FIG. 2A.
Figure 2D:
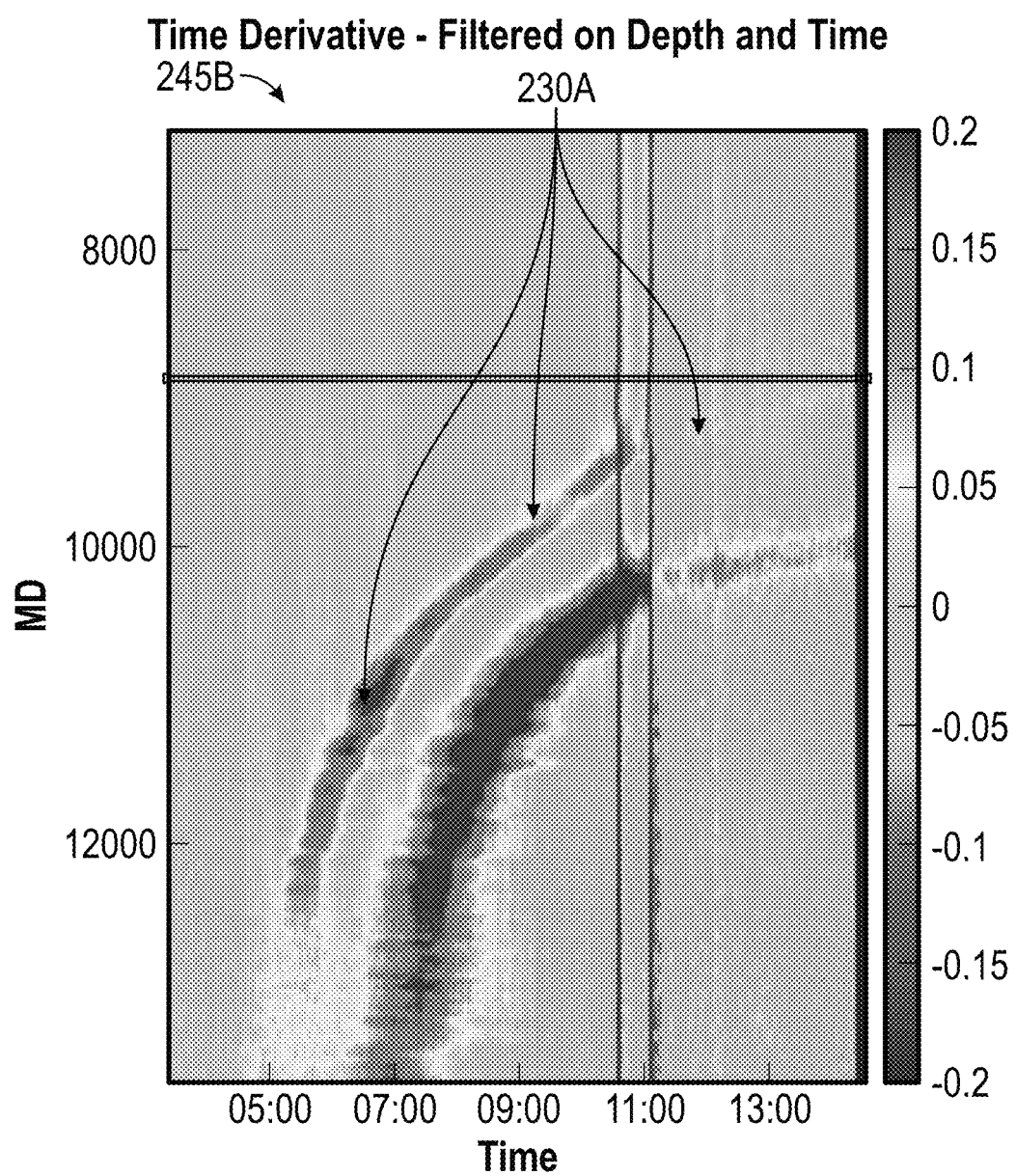

FIG. 2D further illustrates a closer view of a portion of FIG. 2B and FIG. 2C having the thermal change as time progresses. In this case, graph 245A focuses on depths from about 8,000 to about 14,000 ft, thereby magnifying the upper portion of thermal change illustrated by arrows 230. Similarly graph 245B shows the temperature and time frame but with time derivative, and filtered on depth and time, more clearly showing the change in temperature, illustrated by arrows 230A. FIGS. 2A-2D show that various means of processing the data enhances the clarity and ability to identify areas of interest both in depth and time thus enabling identification of events like start of cement curing in time, areas with higher thermal activity, shallowest depth where cement is curing (also called top of cement) and other events of interest. Processing may include steps, for example, where the temperature data may be filtered in the frequency domain followed by detection of changes in the rate of thermal change in time and/or depth may be utilized for automatic detection and identification of events, both in post-processing mode and/or real-time mode. Some embodiments may include, for example, to low pass filter the thermal data to remove instrument related noise, and then conduct an iterative calculation loop where the rate of change is calculated, and which may be displayed, for different values as can be seen in FIGS. 225B, 240B and 245B. The rate of change may be adjusted in various steps and magnitudes as required for clarity and based on available data. The automatic processing may be executed Theory for Generalized Model—

The thermal measurements can be analyzed to develop a model for determining a generalized heat transfer coefficient (k) and a generalized geothermal profile ($T_{ae}$) at different times and depths. The generalized model takes into account thermal exchange with the formation of a static fluid, a moving fluid, and furthermore takes into account heat generated by reaction of the fluid itself, such as cement.

(1) Model for Thermal Decay—

For a non-reactive fluid, static in the wellbore, the temperature change is primarily due to thermal exchanged to its surroundings. For such scenarios, the temperature is described using a simple lumped parameter model as follows:

$$A\left(\rho C_p \frac{dT}{dt}\right) = \cdot \pi D \cdot U_{af}(T_a - T) \tag{1}$$

2. Model for Advection and Thermal Decay—

The temperature of the wellbore fluid changes due to the fluid movement (pumping, lost circulation), along with thermal exchange to the surroundings due to convection and condition, which is described as follows:

$$A\left(\rho C_p \frac{dT}{dt}\right) = \cdot \pi D \cdot U_{af}(T_a - T) + Q\rho C_p(T_b - T) \tag{2}$$

3. Model for Advection, Heat Generation (Source) and Thermal Decay—

For reactive systems like cement, the fluid temperature additionally changes due to the exothermic processing cement setting. Temperature change for the fluid in the wellbore at a given cross section is described as follows:

$$A\left(\rho C_p \frac{dT}{dt}\right) = \cdot \pi D \cdot U_{af}(T_a - T) + Q\rho C_p(T_b - T) + HOH * A \tag{3}$$

Where A is the cross-sectional area, $\rho$ is the fluid density, $C_p$ is the heat capacity, D is the equivalent diameter, $T_a$ is the geothermal profile, $T_b$ is incoming fluid temperature, Q is the volumetric flow rate, heat of hydration (HOH) HOH is the rate of heat released by the fluid at time t and T is the temperature of the fluid itself 4. Generalized Model $$\frac{dT}{dt} = k \cdot (T_{ae} - T) \tag{4}$$

Equations (1) to (3) may be simplified into equation (4) with the assumption that everything else stays constant for short durations apart from the fluid temperature.

For a system where fluid temperatures are collected (at a given depth) at discrete time intervals the Equation (4) is discretized as follows.

$$T_{i+1}^{decay} = T_f - (T_{ae} - T_i) \cdot \exp(-k \cdot \Delta t) \tag{5}$$

When $\Delta t$ is small, Eq (2) can be modified to the following form.

$$T_{i+1} = (1 - k\delta t)T_i + k\delta t T_{ae} \tag{6}$$

Estimation of Generalized Heat Transfer Coefficient k and Generalized Geothermal Profile $T_{ae}$ The lumped parameters generalized heat transfer coefficient (k) and generalized geothermal profile ($T_{ae}$), can be estimated from the data obtained from the DTS including the temporal thermal profile itself. Using equation (6), k is evaluated by linear regression between a next time step temperatures ($T_2$) and a current time step temperatures ($T_1$) over a period of time at a particular depth.

Figure 3:
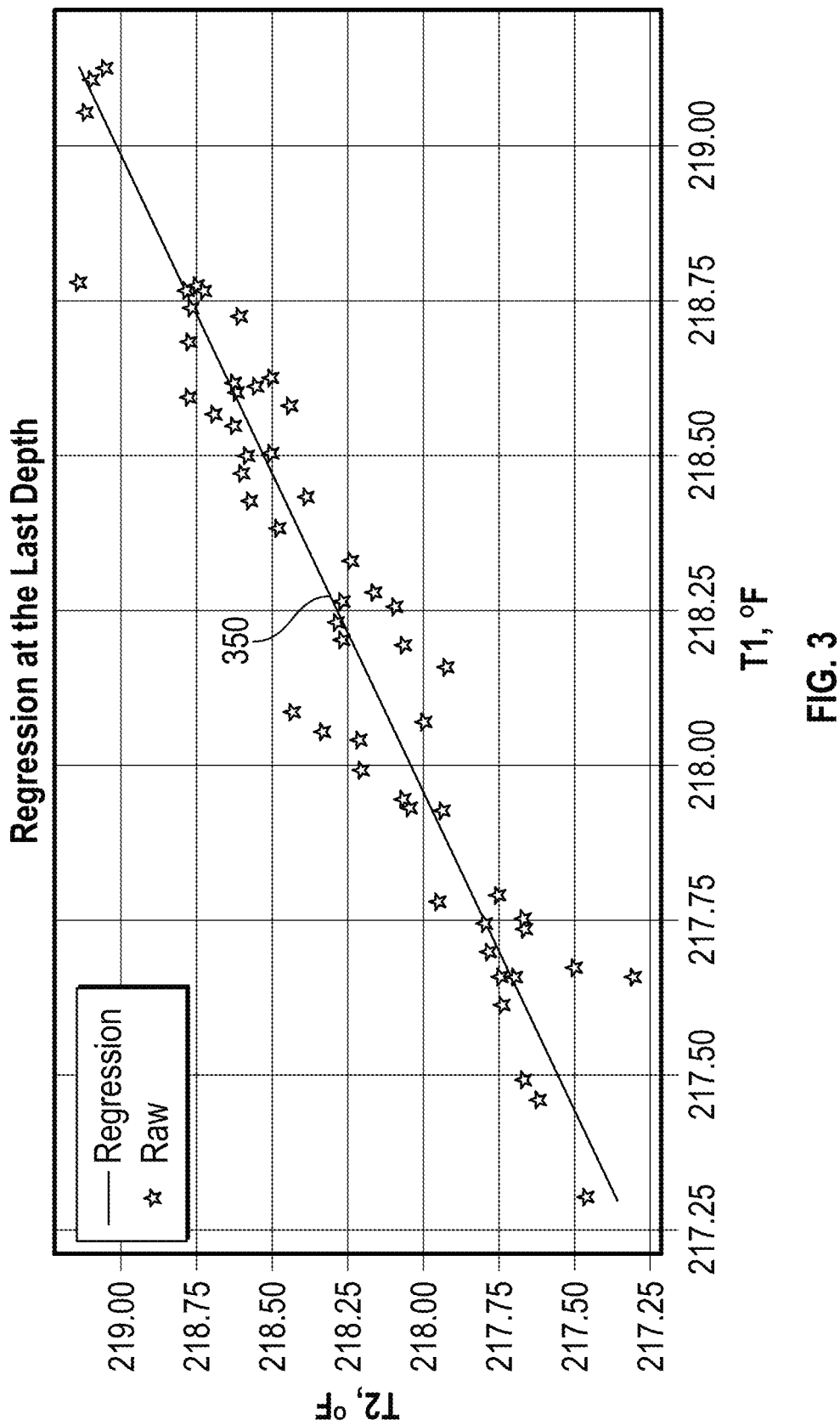
FIG. 3 illustrates example data collected from a distributed temperature sensing system ("DTS") used for estimation of a generalized heat transfer coefficient (k) and a generalized geothermal profile ($T_{ae}$) in accordance with aspects of the present disclosure.

FIG. 3 illustrates example data collected from a DTS used for estimation of a generalized heat transfer coefficient (k)

and a generalized geothermal profile ($T_{ae}$). As shown in the graph of FIG. 3, the y-axis is that of ($T_2$) (a next time step temperature) and the x-axis is ($T_1$) (an current time step temperature) in ° F. Accordingly, to generate the graph, for a particular depth, a plurality of temperatures are taken over time, with the differences being plotted with respect to one another. In particular, for instance, a plurality of temperatures 1, 2, 3, 4, 5 . . . n are taken, and wherein 2 . . . n may be plotted on the y-axis (as $T_2$), and 1 . . . n may be plotted on the x-axis as ($T_1$).

This may be conducted for each of the plurality of depths. The raw data points may entered into the graph and then the raw data is modeled employing a linear approach. For instance, as shown in FIG. 3, a linear regression represent by the fitted line 350 (which is blue in color) is modeled. Using this fitted line, (k) and ($T_{ae}$) may be determined employing equation (6). In particular, the slop of the fitted line 350 is $1-k\delta t$ which may be used as an estimate of (k). Further, the y-axis intercept based on equation (6), which corresponds to $k\delta t T_{ae}$ gives an estimate of the geothermal profile, ($T_{ae}$). This may be carried out at each of the plurality of depths of a wellbore to determine (k) and ($T_{ae}$) at each depth.

With calculation of the generalized heat transfer coefficient (k), this value may be plotted versus depth. FIG. 3 illustrates example plots of generalized heat transfer coefficient calculated across depth, immediately after the pumping activity. Referring back to FIG. 2, the pumping activity ends by 535 minutes. FIG. 3 illustrates a result of the analysis performed on the data after the pumping activity ended after a period of 1 hour. The graph of FIG. 3 illustrates in a qualitative fashion what may be occurring in the wellbore with the particular fluid under examination. In FIG. 3 there is shown two sharp transitions for the heat transfer coefficient, which are indicate geometry changes of the wellbore which may include for instance, the presence of previous casing. For instance, the sharp transitions include one between 0 and 2,500 ft, where the trend shifts suddenly from the right to the left, and similarly a second transition between 5,000 and 7,500 where again the trend shifts from the right to the left. Moreover, the increase in "noise" below 12,500 ft, indicated by the wider spread of the initial decay rate across the horizontal width of the graph indicates other qualitative changes, such as a hydration reaction by the cement in the wellbore.

Accordingly, a graph of the generalized heat transfer coefficient calculated across depth of a wellbore may give qualitative indications regarding various properties and parameters of the wellbore and cement within the wellbore. With changes in the graph, these indicate corresponding changes within the wellbore. These include changes in geometry of the wellbore, including the shape of the wellbore itself, as well as changes in the casing, such as casing diameter, as well as changes in the fluid itself, including whether it may be under a hydration reaction and therefore in the process of hardening, or if no noise is shown then and indication that there is no reaction occurring. Other qualitative indications may be determined as well, that there is some change occurring in the well bore, as indicated by changes in the graph of the generalized heat transfer coefficient calculated across depth of a wellbore.

Figure 4:
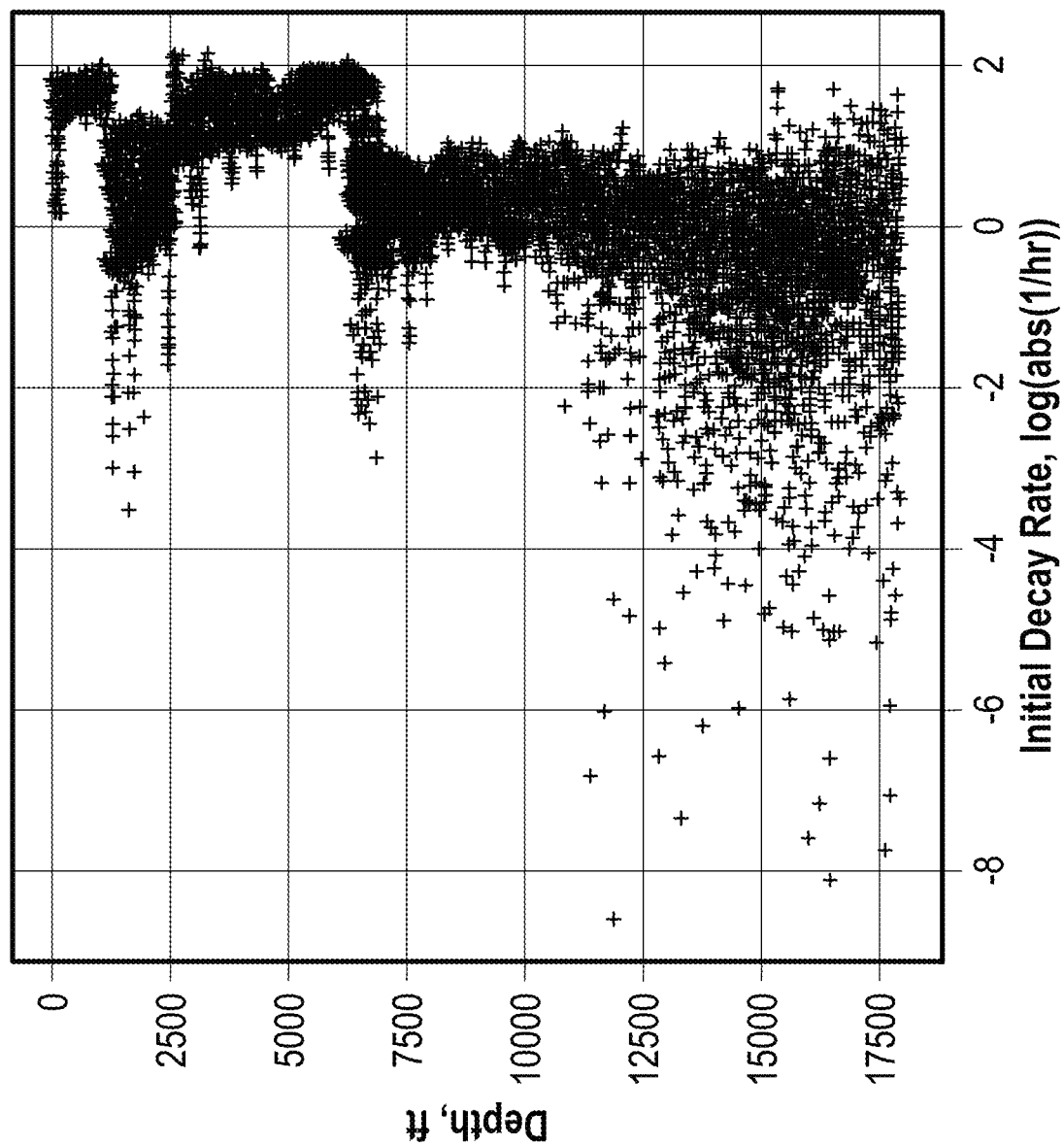
FIG. 4 illustrates example plots of generalized heat transfer coefficient calculated across depth, immediately after pumping activity in accordance with aspects of the present disclosure.

Further, for generalized geothermal profile ($T_{ae}$), this value may be plotted versus depth. FIG. 4 illustrates example plots of the generalized geothermal profile calculated across depth, immediately after pumping activity. As the depth increases, the temperature similarly increases. The smooth lines of a maximum temperature is shown as well as a smoothed estimate of the raw generalized geothermal profile estimate ($T_{ae}$). FIG. 4 indicates the generalized geothermal profile significantly differing from the fluid temperatures, which is indicative of heat of hydration. In particular, the increase in noise of the $T_{ae}$ starting at about 12,500 ft and below, indicated by the disparate lateral points of the raw ($T_{ae}$) away from the smoothed estimate line, indicates that a qualitative change is occurring in the fluid system. This change is likely due to the heat of hydration of the cement as it hardens. Additionally, noise, indicated by the disparate lateral points of the raw ($T_{ae}$) away from the smoothed estimate line, also occurs to a lesser degree at between 0 and 2,500 ft, and also at around 7,500 ft, and which may indicate also some qualitative change is occurring in the system. The changes at these points may correspond to changes in geometry of the wellbore.

Heat of Hydration Index

The temporal profile of the wellbore may also be employed to determine the heat of hydration of a fluid in the wellbore. The fluid may be any fluid which undergoes an exothermic reaction. Cement used for fixing a casing within a wellbore undergoes an exothermic hydration reaction during its hardening process which releases heat as part of the reaction.

Figure 5:
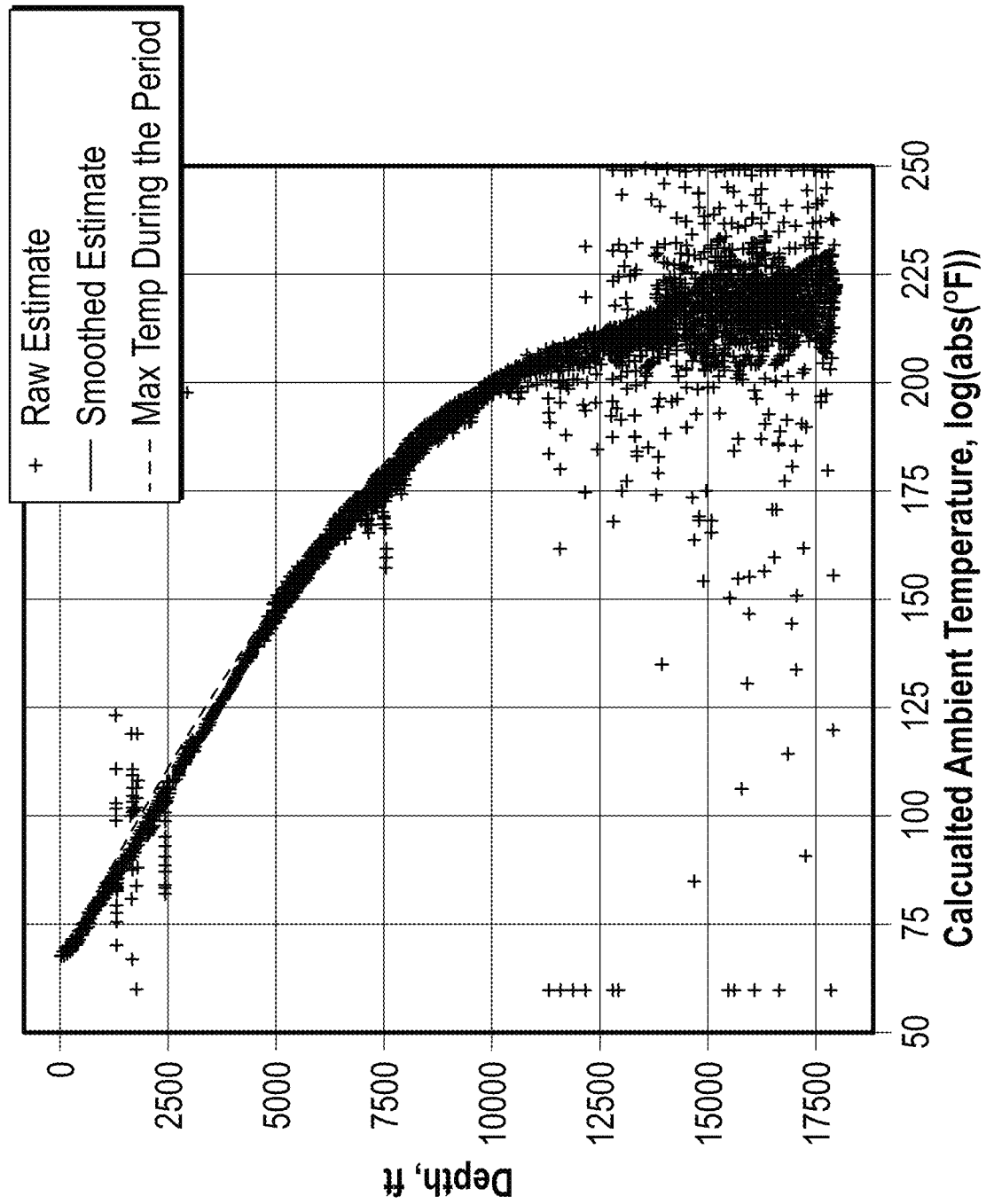
FIG. 5 illustrates example plots of generalized geothermal profiles calculated across depth, immediately after pumping activity in accordance with aspects of the present disclosure.
Figure 6:
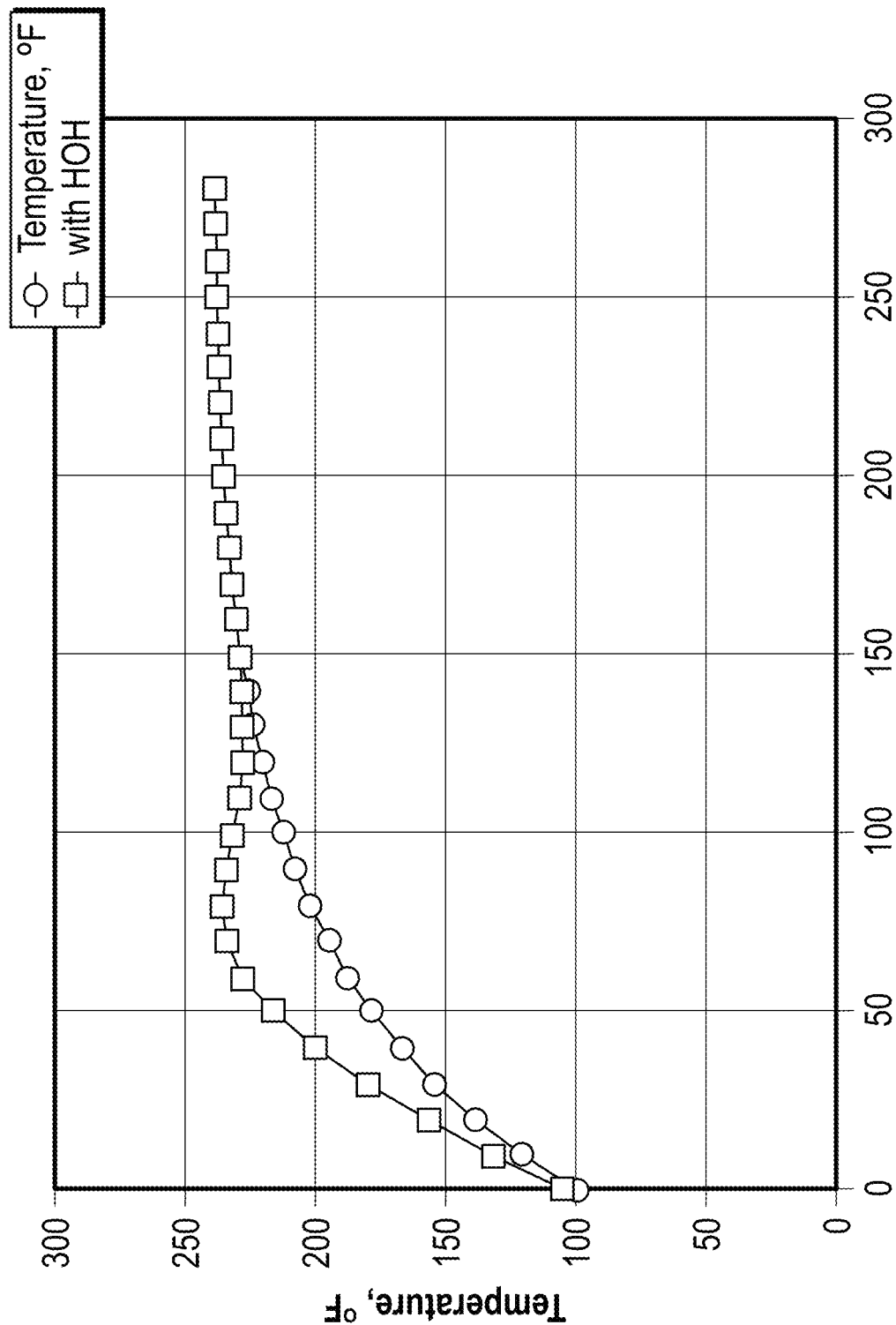
FIG. 6 illustrates example plots of a fluid system with heat of hydration versus without heat of hydration for determination of a heat of hydration generalized geothermal profiles calculated across depth, immediately after pumping activity.

FIG. 5 illustrates a schematic representation of fluid temperature change with heat of hydration vs without heat of hydration. As shown, the lower line representing the without heat of hydration plot is a typical thermal recovery of fluid after it is placed in the annulus of the wellbore, and may be referred to herein as the baseline thermal response. The heat of hydration plot indicates the thermal profile with the heat of hydration effect of the wellbore fluid. In case of cement during the wait on cement period (WOC), the heat of hydration plot is the actual measurement by the DTS, while the baseline thermal response plot is unknown.

A bond index may be determined which indicates the difference between the fluid temperature heat of hydration versus the baseline thermal response to show the heat of hydration. The definition of the bond index relies on approximating the baseline thermal response throughout the wellbore. There are various methods for determining an estimate of the baseline thermal response.

Estimation of base line behavior in the absence of heat of hydration activity from the actual wellbore fluid temperature may be used for determining the bond index. The generalized thermal decay model of equation (6) may be employed and modified such that the generalized geothermal profile ($T_{ae}$) is replaced with the geothermal profile ($T_a$):

$$T_{i+1}^{Estimate} = (1-k\delta t)T_i + k\delta t T_a \qquad (7)$$

For known values, the $T_{i+1}^{Estimate}$ from the above equation (7) will not include any contribution for the heat of hydration. The difference between this estimate and the actual temperature summed over the entire duration of WOC gives a relative estimate of the heat of hydration of the cement. Hence, the heat of hydration index can be determined as follows:

$$HOH \text{ index} = \sum_{all\ i} T_i^{Actual} T_i^{Estimate}$$

Similarly to the determination of lumped parameters heat transfer coefficient (k) and the generalized geothermal profile ($T_{ae}$) of Eq. 6 can determined the temporal profile, so the lumped parameters (k) and ($T_a$) of eq. 7 can be determined from the temporal profile as well. For estimate of the generalized heat coefficient (k), the data employed is that where the wellbore fluids are static and there is no heat generation activity, typically the period immediately after pumping cement into the wellbore.

$$T_{i+1}A = \pi r^2 = (1-k\delta t)T_i + k\delta t T_a \qquad (8)$$

Based on the above, generalized heat coefficient (k) based on data as presented in FIG. 3, in a similar manner has was determined for (k) of equation (6). In particular, for (k) of equation (8), the value is determined based on the linear regression between a next time step temperatures ($T_2$) and a current time step temperatures ($T_1$) over a period of time at a particular depth.

The geothermal profile ($T_a$) of eq. 8 is the temperature of the near-by formation. This value changes throughout a cement job or other wellbore process. In particular, this value can be determined based on (1) the starting geothermal profile immediately after cement is pumped into the wellbore and prior to any exothermic reaction by the cement, such as the heat of hydration, and (2) the steady state temperature at the end of the WOC period. Wait on cement is the period of time after pumping a cement in slurry form downhole until it hardens, operations are generally suspended until the cement has hardened during this time.

Referring back to FIG. 5, the generalized heat coefficient (k) and the determined geothermal profile ($T_a$) of eq. 8 may be used as the baseline thermal response. This is the compared with the actual measured temperature for the determination of the heat of hydration.

It is also possible to simulate the thermal response of the wellbore using a physics based thermal model and compare the results with the measurements. The thermal model can have various thermal properties and the geometry as parameters, some of these parameters can have a larger window of uncertainty. For example, the heat transfer coefficient between wellbore fluid and the formation can have greater uncertainty compared to wellbore geometry. It is possible to compare the model result with the measurements and estimate the unknowns by building an 'inverse model'.

In addition to the above, the present technology may be implemented across a plurality of wellbores. Accordingly, with each or a plurality of wells, the system may be trained or improved analysis via machine learning, artificial neural network artificial intelligence, to identify qualitative changes in the data and/or match what is occurring in the fluid system or wellbore. The machine learning model may be based, for instance, on random forest and/or another machine learning algorithm such as support vector machine (SVM) and neural networks.

DTS System

Referring to the Distributed Temperature Sensing System in FIGS. 1A-C and regarding the sensing capabilities and sensor types contemplated in the present technology disclosure, permanently installed sensors can be used, and the sensors may include distributed fiber optic sensors systems having fiber optic cables positioned in the cement in the annular space between the casing and formation. The fiber optic cables may be clamped to the outside of the casing during the deployment, and protected by centralizers and cross coupling clamps.

The fiber optic cables may house one or several optical fibers, and the optical fibers may be single mode fibers, multi-mode fibers or a combination of single mode and multi-mode optical fibers.

The fiber optic sensing systems may operate using various sensing principles for determination of temperature including Raman scattering, Brillouin scattering, Coherent Rayleigh backscatter, and/or a combination of aforementioned with Enhanced or Engineered fibers. Raman backscattering (which is due to thermally excited molecular vibration known as optical phonons) may have an intensity which varies with temperature, whereas Brillouin backscattering (which is due to thermal excited acoustic waves known as acoustic phonons) has a wavelength which varies with both temperature and strain, and so may be employed herein to detect temperature. Rayleigh backscattering measures changes in optical path length where the change in optical path length can be induced by temperature or strain where strain can be mechanical pull on the fiber or acoustic vibration. Fiber Bragg Grating (FBG) based systems may also be employed. Bragg grating can be used to detect strain and a change in optical path length along the optical fiber. Since a change in temperature will also cause a change in optical path length along the fiber optic cable, the Bragg grating can also, or alternatively, be used as a temperature sensor to sense temperature along the waveguide. Bragg gratings may be spaced out along the fiber optic cable, then a temperature profile along the fiber optic cable can be detected using the Bragg gratings. In the case of Enhanced backscattering in optical fibers, the fiber itself is engineered to possess reflection enhancing features along its length that offer greater signal strength compared with intrinsic Rayleigh backscatter alone. Such internal features may include Fiber Bragg Gratings and/or microstructures within the glass fiber core. Raman, Rayleigh, Brillouin, and FBG based measurements all have temperature responses and can be used for monitoring cement along a wellbore in slurry or hardened form. Raman, Brillouin and FBG can measure absolute temperature and changes over time.

Various hybrid approaches where single point or quasi-distributed or distributed fiber optic sensors are mixed with e.g. electrical sensors are also anticipated. The fiber optic cable may then include optical fiber and electrical conductors.

Control Unit

Figure 7:
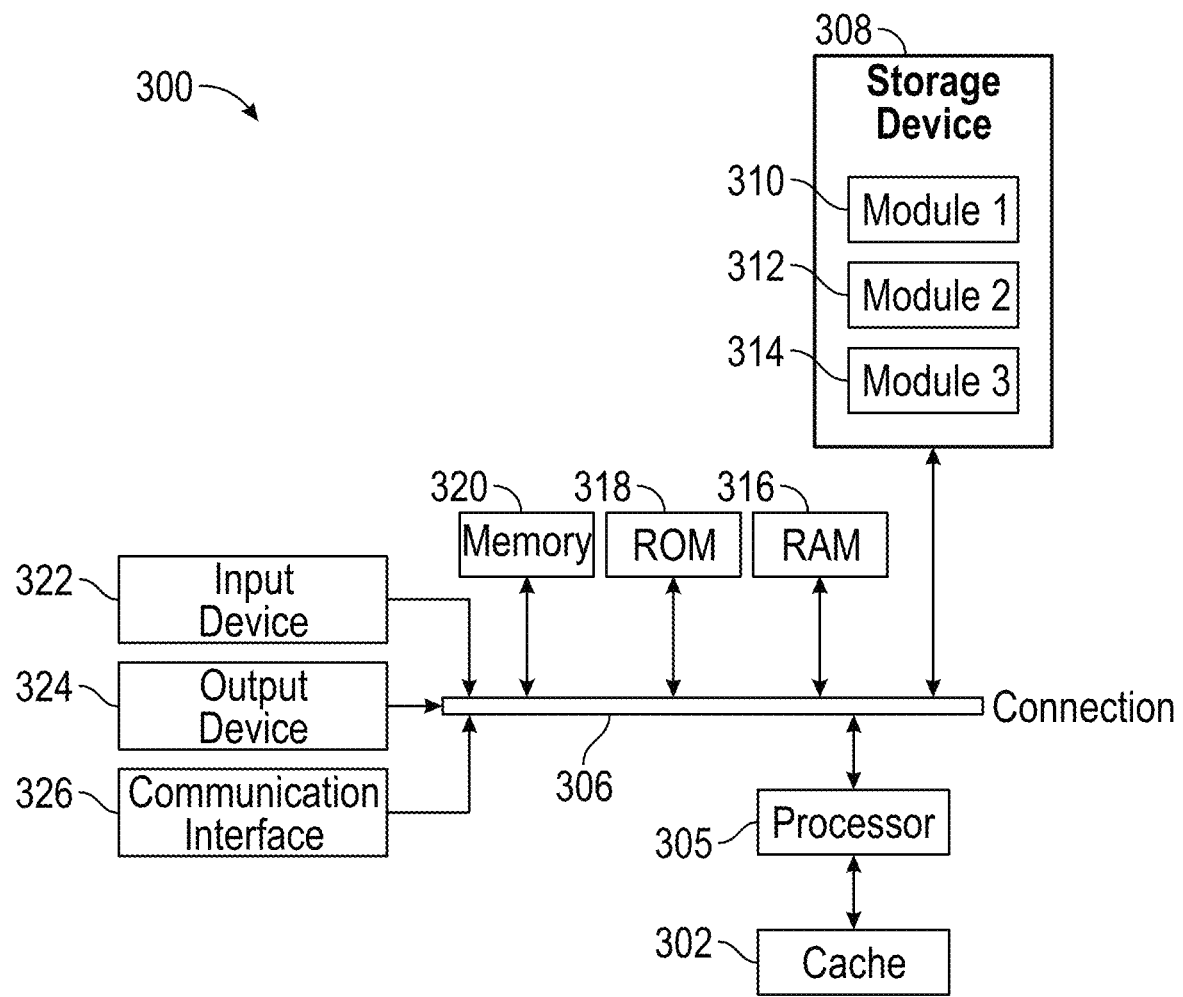
FIG. 7 is a schematic diagram of an example control unit for implementation with the present disclosure.

Specifically, FIG. 7 illustrates system architecture 300 which may be the control unit 128 of FIGS. 1A and 1B, in order to interact with the DTS system including the transmission and receipt of optical signal, as well as carrying out the processing for determination of the vales disclosed herein including all and any one of equations (1)-(8). As illustrated, the components of the system may be in electrical communication with each other using a bus 306. System architecture 300 can include a processing unit (CPU or processor) 305, as well as a cache 302, that are variously coupled to system bus 306. Bus 306 couples various system components including system memory 320, (e.g., read only memory (ROM) 318 and random access memory (RAM) 316), to processor 305. System architecture 300 can include a cache of high-speed memory connected directly with, in close proximity to, or integrated as part of the processor 305. System architecture 300 can copy data from the memory 320 and/or the storage device 308 to the cache 302 for quick access by the processor 305. In this way, the cache can provide a performance boost that avoids processor 305 delays while waiting for data. These and other modules can control or be configured to control the processor 305 to perform various actions. Other system memory 320 may be available for use as well. Memory 320 can include multiple different types of memory with different performance characteristics. Processor 305 can include any general-purpose processor and a hardware module or software module, such as module 1 (310), module 2 (312), and module 3 (314) stored in storage device 308, configured to control processor 305 as well as a special-purpose processor where software instructions are incorporated into the actual processor design. Processor 305 may essentially be a completely self-contained computing system, containing multiple cores or processors, a bus, memory controller, cache, etc. A multi-core processor may be symmetric or asymmetric.

To enable user interaction with the computing system architecture 300, input device 322 can represent any number of input mechanisms, such as a microphone for speech, a touch-sensitive screen for gesture or graphical input, keyboard, mouse, motion input, and so forth. An output device 324 can also be one or more of a number of output mechanisms. In some instances, multimodal systems can enable a user to provide multiple types of input to communicate with the computing system architecture 300. The communications interface 326 can generally govern and manage the user input and system output. There is no restriction on operating on any particular hardware arrangement and therefore the basic features here may easily be substituted for improved hardware or firmware arrangements as they are developed.

Storage device 308 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 316, read only memory (ROM) 318, and hybrids thereof.

Storage device 308 can include software modules 310, 312, 314 for controlling the processor 305. Other hardware or software modules are contemplated. The storage device 308 can be connected to the system bus 306. In one aspect, a hardware module that performs a particular function can include the software component stored in a computer-readable medium in connection with the necessary hardware components, such as the processor 305, bus 306, output device 324, and so forth, to carry out various functions of the disclosed technology.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in standalone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Cement

As used herein, a cement may include any cement and/or any kind of material capable of being pumped to flow to a desired location, and capable of setting into a solid mass at the desired location. In many cases, common calcium-silicate hydraulic cement is suitable, such as Portland cement. Calcium-silicate hydraulic cement includes a source of calcium oxide such as burnt limestone, a source of silicon dioxide such as burnt clay, and various amounts of additives such as sand, pozzolan, diatomaceous earth, iron pyrite, alumina, and calcium sulfate. In some cases, the cement may include polymer, resin, or latex, either as an additive or as the major constituent of the cement. The polymer may include polystyrene, ethylene/vinyl acetate copolymer, polymethylmethacrylate polyurethanes, polylactic acid, polyglycolic acid, polyvinylalcohol, polyvinylacetate, hydrolyzed ethylene/vinyl acetate, silicones, and combinations thereof. The cement may also include reinforcing fillers such as fiberglass, ceramic fiber, or polymer fiber. The cement may also include additives for improving or changing the properties of the cement, such as set accelerators, set retarders, defoamers, fluid loss agents, weighting materials, dispersants, density-reducing agents, formation conditioning agents, lost circulation materials, thixotropic agents, suspension aids, or combinations thereof.

Various examples are provided herein to enhance understanding of the present disclosure. A specific set of statements are provided as follows:

Statement 1. A method comprising: receiving data from a distributed temperature sensor system installed in a wellbore, the data representative of a temporal thermal profile of the wellbore; determining, by one or more processors, a property or parameter associated with the wellbore or wellbore fluid based on the temporal thermal profile.

Statement 2. The method of statement 1 comprising determining at least one of a generalized transfer coefficient (k) of a fluid within the wellbore or a generalized geothermal profile ($T_{ae}$) of the wellbore based on the temporal thermal profile.

Statement 3. The method of statement 1 or 2, wherein the fluid is cement within the wellbore.

Statement 4. The method of any one of the preceding statements 1-3, wherein at least one of a generalized transfer coefficient (k) of a fluid within the wellbore, or a generalized geothermal profile ($T_{ae}$) of the wellbore is determined based on a model comprising advection of a fluid within the wellbore.

Statement 5. The method of any one of the preceding statements 1-4, at least one of a generalized transfer coefficient (k) of a fluid within the wellbore, or a generalized geothermal profile ($T_{ae}$) of the wellbore is determined based on a model comprising heat generated within the wellbore.

Statement 6. The method of statement 5, wherein the heat generated within the wellbore is generated from an exothermic reaction of a cement slurry within the wellbore.

Statement 7. The method of any one of the preceding statements 1-6, comprising determining both the generalized transfer coefficient (k) of a fluid within the wellbore and the generalized geothermal profile ($T_{ae}$) based on a formula comprising: $T_{i+1}=(1-k\delta t)T_i+k\delta t T_{ae}$, wherein $T_i$ is an initial temperature, and t is time.

Statement 8. The method of any one of the preceding statements 1-7, wherein a property or parameter associated with the wellbore comprises a property or parameter of a fluid within the wellbore or formation surrounding the wellbore.

Statement 9. The method of any one of the preceding statements 1-8, wherein a property or parameter associated with the wellbore is selected from one or more of a wellbore geometry across depth, a static fluid profile, a pumping activity, a loss circulation, heat of hydration, a heat release activity, and combinations thereof.

Statement 10. The method of any one of the preceding statements 7-9, further comprising displaying a graph comprising depth versus a value based on the generalized transfer coefficient (k).

Statement 11. The method of any one of the preceding statements 7-10, further comprising displaying a graph comprising depth versus a value based on the generalized geothermal profile ($T_{ae}$).

Statement 12. The method of any one of the preceding statements 1-11, comprising determining at least one of a generalized transfer coefficient (k) of a fluid within the wellbore and a starting geothermal profile ($T_a$) based on the temporal thermal profile of the wellbore, the geothermal profile determined after introduction of a fluid into the wellbore but prior to the fluid releasing exothermic reaction heat.

Statement 13. The method of any one of the preceding statements 1-12, determining the heat of hydration by comparing the measured temperature by distributed temperature sensor system with a baseline thermal response model determined based on the generalized transfer coefficient (k) of a fluid within the wellbore and the starting geothermal profile ($T_a$).

Statement 14. The method of any one of the preceding statements 1-13, wherein the distributed temperature sensor system is a fiber optic sensor system comprising a fiber optic cable disposed in a wellbore.

Statement 15. The method of any one of the preceding statements 1-14, wherein the more fiber optic sensing system operates according to one or more of a Rayleigh backscattering, Brillouin backscattering, Raman backscattering, Fiber Bragg Grating, or Enhanced or Engineered fiber based sensing principle.

Statement 16. The method of any one of the preceding statements 1-15, wherein the fiber optic cable is provided within a cement slurry in an annulus of the wellbore.

Statement 17. The method of any one of the preceding statements 1-16, modifying a cementing operation based on the determined generalized transfer coefficient (k) of a fluid within the wellbore or a generalized geothermal profile ($T_{ae}$).

Statement 18. A system comprising: one or more processors; and a non-transitory memory coupled to the one or more processors, wherein the memory comprises instruction configured to cause the processors to perform operations for: receiving data from a distributed temperature sensor system installed in a wellbore, the data representative of a temporal thermal profile of the wellbore; determining a property or parameter associated with the wellbore based on the temporal thermal profile obtained from a distributed temperature sensor system installed in a wellbore.

Statement 19. The system of statement 18, further comprising the distributed temperature sensor system installed in a wellbore, the distributed temperature sensor system comprising a fiber optic cable in the wellbore.

Statement 20. The system of statement 18 or 19, wherein the memory comprises instruction configured to cause the processors to perform operations for determining at least one of a generalized transfer coefficient (k) of a fluid within the wellbore or a generalized geothermal profile ($T_{ae}$) of the wellbore based on the temporal thermal profile.

Statement 21. A tangible, non-transitory, computer-readable media having instructions encoded thereon, the instructions, when executed by a processor, are operable to perform operations for: receiving data from a distributed temperature sensor system installed in a wellbore, the data representative of a temporal thermal profile of the wellbore; determining a property or parameter associated with the wellbore based on the temporal thermal profile.

Statement 22. The tangible, non-transitory, computer-readable media of statement 21, wherein the distributed temperature sensor comprises a fiber optic cable in the wellbore.

Statement 23. The tangible, non-transitory, computer-readable media of statement 21 or 22, wherein the instructions are further configured to cause the processors to perform operations for: determining at least one of a generalized transfer coefficient (k) of a fluid within the wellbore or a generalized geothermal profile ($T_{ae}$) of the wellbore based on the temporal thermal profile.

What is claimed is:
1. A method comprising:
receiving data from a distributed temperature sensor system installed in a well bore, the data representative of a temporal thermal profile of the well bore;
filtering the data in the frequency domain to generate filtered data representative of the temporal thermal profile of the well bore;
determining, by one or more processors, a property or parameter associated with the well bore or well bore fluid from the filtered data based on the temporal thermal profile;
applying a model based on characteristics of with the well bore or the well bore fluid associated with the property or the parameter associated with the well bore or the well bore fluid to identify a simulated property or parameter corresponding to the property or parameter associated with the well bore or well bore fluid that is identified based on the temporal thermal profile, wherein the simulated property or parameter comprises a generalized transfer coefficient (k) of a fluid within the well bore and a generalized geothermal profile (T ae), and the model is applied based on a formula comprising:

$$T_{i+1}=(1-k\delta t)T_i+k\delta t T_{ae}$$

wherein Ti is an initial temperature, and t is time;
comparing a property or parameter to the simulated property or parameter; and
identifying an unknown property or parameter associated with the well bore or well bore fluid through an inverse model based on the comparison.

2. The method of claim 1 comprising determining at least one of a generalized transfer coefficient (k) of a fluid within the well bore or a generalized geothermal profile (T ae) of the wellbore based on the temporal thermal profile.

3. The method of claim 2, modifying a cementing operation based on the determined generalized transfer coefficient (k) of the fluid within the wellbore or the generalized geothermal profile (T ae).

4. The method of claim 1, wherein the fluid is cement within the wellbore.

5. The method of claim 1, wherein at least one of a generalized transfer coefficient (k) of a fluid within the well bore, or a generalized geothermal profile (Tae) of the well bore is determined based on a model comprising advection of a fluid within the well bore.

6. The method of claim 1, wherein at least one of the generalized transfer coefficient (k) of the fluid within the well bore, or the generalized geothermal profile (T ae) of the well bore is determined based on the model that accounts for heat generated within the wellbore.

7. The method of claim 6, wherein the heat generated within the wellbore is generated from an exothermic reaction of a cement slurry within the well bore.

8. The method of claim 1, wherein a property or parameter associated with the wellbore comprises a property or parameter of a fluid within the wellbore or formation surrounding the wellbore.

9. The method of claim 1, wherein a property or parameter associated with the wellbore is selected from one or more of a wellbore geometry across depth, a static fluid profile, a pumping activity, a loss circulation, heat of hydration, a heat release activity, and combinations thereof.

10. The method of claim 1, further comprising displaying a graph comprising depth versus a value based on the generalized transfer coefficient (k).

11. The method of claim 1, further comprising displaying a graph comprising depth versus a value based on the generalized geothermal profile (Tae).

12. The method of claim 1, comprising determining at least one of a generalized transfer coefficient (k) of a fluid within the well bore and a starting geothermal profile (Ta) based on the temporal thermal profile of the well bore, the geothermal profile determined after introduction of a fluid into the well bore but prior to the fluid releasing exothermic reaction heat.

13. The method of claim 1, determining the heat of hydration by comparing the measured temperature by distributed temperature sensor system with a baseline thermal response model determined based on the generalized transfer coefficient (k) of a fluid within the well bore and the starting geothermal profile (Ta).

14. The method of claim 1, wherein the distributed temperature sensor system is a fiber optic sensor system comprising a fiber optic cable disposed in a wellbore.

15. The method of claim 14, wherein the fiber optic sensing system operates according to one or more of a Rayleigh backscattering, Brillouin backscattering, Raman backscattering, Fiber Bragg Grating, or Enhanced or Engineered fiber based sensing principle.

16. The method of claim 1, wherein the fiber optic cable is provided within a cement slurry in an annulus of the well bore.

17. A system comprising:
one or more processors; and
a non-transitory memory coupled to the one or more processors, wherein the memory comprises instruction configured to cause the processors to perform operations for:
receiving data from a distributed temperature sensor system installed in a well bore, the data representative of a temporal thermal profile of the well bore;
filtering the data in the frequency domain to generate filtered data representative of the temporal thermal profile of the well bore;
determining a property or parameter associated with the well bore from the filtered data based on the temporal thermal profile obtained from a distributed temperature sensor system installed in a wellbore;
applying a model based on characteristics associated with the well bore or the well bore fluid associated with the property or the parameter associated with the well bore or the well bore fluid to identify a simulated property or parameter corresponding to the property or parameter associated with the well bore or well bore fluid that is identified based on the temporal thermal profile, wherein the simulated property or parameter comprises a generalized transfer coefficient (k) of a fluid within the well bore and a generalized geothermal profile (T ae), and the model is applied based on a formula comprising:

$$T_{i+1}=(1-k\delta t)T_i+k\delta t T_{ae}$$

wherein Ti is an initial temperature, and t is time;
comparing a property or parameter to the simulated property or parameter; and
identifying an unknown property or parameter associated with the well bore or well bore fluid through an inverse model based on the comparison.

18. The system of claim 17, further comprising the distributed temperature sensor system installed in a well bore, the distributed temperature sensor system comprising a fiber optic cable in the wellbore.

19. The system of claim 17, wherein the memory comprises instruction configured to cause the processors to perform operations for determining at least one of the generalized transfer coefficient (k) of the fluid within the well bore or the generalized geothermal profile (Tae) of the well bore based on the model that accounts for heat generated within the wellbore.

20. A tangible, non-transitory, computer-readable media having instructions encoded thereon, the instructions, when executed by a processor, are operable to perform operations for:
receiving data from a distributed temperature sensor system installed in a well bore, the data representative of a temporal thermal profile of the well bore;
filtering the data in the frequency domain to generate filtered data representative of the temporal thermal profile of the well bore;
determining a property or parameter associated with the well bore from the filtered data based on the temporal thermal profile;

applying a model based on characteristics associated with the well bore or the well bore fluid associated with the property or the parameter associated with the well bore or the well bore fluid to identify a simulated property or parameter corresponding to the property or parameter associated with the well bore or well bore fluid that is identified based on the temporal thermal profile, wherein the simulated property or parameter comprises a generalized transfer coefficient (k) of a fluid within the well bore and a generalized geothermal profile (T ae), and the model is applied based on a formula comprising:

$$T_{i+1}=(1-k\delta t)T_i+k\delta t T_{ae}$$

wherein Ti is an initial temperature, and t is time;

comparing a property or parameter to the simulated property or parameter; and identifying an unknown property or parameter associated with the well bore or well bore fluid through an inverse model based on the comparison.

21. The tangible, non-transitory, computer-readable media of claim 20, wherein the distributed temperature sensor comprises a fiber optic cable in the wellbore.

22. The tangible, non-transitory, computer-readable media of claim 20, wherein the instructions are further configured to cause the processors to perform operations for:

determining at least one of the generalized transfer coefficient (k) of the fluid within the well bore or the generalized geothermal profile (Tae) of the well bore based on the model that accounts for heat generated within the wellbore.

* * * * *